(12) United States Patent
Gao et al.

(10) Patent No.: US 10,913,845 B2
(45) Date of Patent: Feb. 9, 2021

(54) X-RAY AND METAL DETECTABLE THERMOSET COMPOSITES FOR USE IN FOOD AND PHARMACEUTICAL MANUFACTURING

(71) Applicant: MOLDED FIBER GLASS COMPANIES, Ashtabula, OH (US)

(72) Inventors: Routian Gao, Willoughby, OH (US); Christine Ann Ericksen, Conneaut, OH (US); Dailene Marie Osborn, Hartstown, PA (US); John Robert Thompson, Conneautville, PA (US)

(73) Assignee: MOLDED FIBER GLASS COMPANIES, Ashtabula, OH (US)

( * ) Notice: Subject to any disclaimer, the term of this patent is extended or adjusted under 35 U.S.C. 154(b) by 119 days.

(21) Appl. No.: 15/781,386

(22) PCT Filed: Dec. 5, 2016

(86) PCT No.: PCT/US2016/064954
§ 371 (c)(1),
(2) Date: Jun. 4, 2018

(87) PCT Pub. No.: WO2017/096366
PCT Pub. Date: Jun. 8, 2017

(65) Prior Publication Data
US 2019/0276663 A1  Sep. 12, 2019

Related U.S. Application Data

(60) Provisional application No. 62/263,351, filed on Dec. 4, 2015.

(51) Int. Cl.
*C08L 67/02* (2006.01)
*C08L 35/02* (2006.01)
(Continued)

(52) U.S. Cl.
CPC .............. *C08L 67/02* (2013.01); *B32B 15/08* (2013.01); *C08K 3/08* (2013.01); *C08K 3/30* (2013.01);
(Continued)

(58) Field of Classification Search
CPC ........................ B32B 15/08; C08K 2003/0887
See application file for complete search history.

(56) References Cited

U.S. PATENT DOCUMENTS

| 4,935,019 A | 6/1990 | Papp, Jr. |
| 6,057,394 A | 5/2000 | Bödiger et al. |

(Continued)

FOREIGN PATENT DOCUMENTS

| EP | 2845492 A1 | 11/2015 |
| WO | 2004060441 A2 | 7/2004 |
| WO | 2010027998 A1 | 3/2010 |

OTHER PUBLICATIONS

Plasticolors® Accumag® Thickener for SMC/BMC; http://www.chromaflo.com/en-US/Thermosets/Products/Plasticolors-Accumag%C2%AE-Thickener-Product-Line-Sheet.aspx.
(Continued)

*Primary Examiner* — Yara B Green
(74) *Attorney, Agent, or Firm* — Vorys, Safer, Seymour and Pease LLP; Scott M. Guttman

(57) ABSTRACT

Provided are X-ray and metal detectable thermoset composites and methods of detecting the same. The present X-ray and metal detectable thermoset composites may be formed into trays, sheets, or other substrates suitable for use in food or pharmaceutical processing or manufacturing.

19 Claims, 13 Drawing Sheets

(51) Int. Cl.
*C08L 63/10* (2006.01)
*G01N 23/04* (2018.01)
*C08K 3/08* (2006.01)
*C08K 3/30* (2006.01)
*B32B 15/08* (2006.01)
*G01V 15/00* (2006.01)

(52) U.S. Cl.
CPC .............. *C08L 35/02* (2013.01); *C08L 63/10* (2013.01); *G01N 23/04* (2013.01); *C08K 2003/0856* (2013.01); *C08K 2003/0887* (2013.01); *C08K 2003/3045* (2013.01); *C08K 2201/004* (2013.01); *C08K 2201/005* (2013.01); *C08K 2201/014* (2013.01); *G01N 2223/618* (2013.01); *G01N 2223/643* (2013.01); *G01N 2223/645* (2013.01); *G01V 15/00* (2013.01)

(56) References Cited

U.S. PATENT DOCUMENTS

| | | | |
|---|---|---|---|
| 6,200,338 | B1 | 3/2001 | Solomon et al. |
| 8,163,812 | B2 | 4/2012 | Renken |
| 8,273,826 | B2 | 9/2012 | Walton et al. |
| 8,404,338 | B2 | 3/2013 | Hein et al. |
| 9,243,140 | B2 | 1/2016 | Walton et al. |
| 9,464,189 | B2 | 10/2016 | Hein et al. |
| 2003/0203991 | A1 | 10/2003 | Schottman et al. |
| 2010/0124644 | A1* | 5/2010 | Hein .................. C08L 69/00 428/220 |
| 2012/0241589 | A1 | 9/2012 | Martin et al. |
| 2013/0181371 | A1 | 7/2013 | Brown |
| 2014/0336689 | A1 | 11/2014 | Elton et al. |

OTHER PUBLICATIONS

Ashland product: Aropol™ MR 63004 Resin https://www.b2bcomposites.ca/msds/ashland/818186B.pdf.
Ashland product: Aropol™ Q6585 Resin https://www.b2bcomposites.com/msds/ashland/632137.pdf.
Coad® Zinc Stearate https://www.noracadditives.com/fileadmin/noracadditives/TDS/TDS_-_COAD_20.pdf.
Röchling product: Polystone® M https://www.roechling.com/industrial/materials/thermoplastics/detail/polystone-m-natural-72/.
Sustapeek XDT http://www.alro.com/divplastics/plasticsproduct_sustapeek_xdt.aspx.
Alro Plastics products: Sustarin® C XDT http://www.alro.com/divplastics/plasticsproduct_sustarin_c_xdt.aspx.
Plastics International product: Tecaform® UD Blue https://www.plasticsintl.com/datasheets/Tecaform%20US%20Blue.pdf.
Researchers field test new plastic detector Jul. 25, 2005 https://www.foodnavigator.com/article/2005/07/25 / researchers-field-test-new-plastic-detector.
Extended Supplementary European Search Report dated Jul. 24, 2019 for Application No. EP 16 87 1709. Applicant: Molded Fiber Glass Companies. 7 pages.
International Search Report and Written Opinion for International Application No. PCT/US2016/064954, International filing Date Dec. 5, 2016, dated Apr. 4, 2017. Blaine R. Copenheaver, Authorized Officer.

* cited by examiner

Table 1

| | | | | No Radiopacity Agent |
|---|---|---|---|---|
| | Ingredients (PHR) | Ingredients (PHR) | Ingredients (PHR) | |
| | Q6585 | UPR, High Reactivity PG-Maleate | Resin A | 60 |
| | Polylite 31009 | Terephthalic Polyester Resin | Resin B | / |
| | Polylite 31610 | Isophthalic Polyester Resin | Resin C | / |
| | Derakane 780 | Epoxy Novalac Vinyl Ester Resin | Resin D | / |
| | MR14029 | Neopentylglycol Isophthalic Resin | Resin E | / |
| | Neulon 50S | Low Profiile Additive Thermoplastic Polyester | Low Profile Additive | 20 |
| | MR-63004 | Shrink Control Additive Poly(1-phenylethene-1,2- | Shrink Control Additive | 20 |
| | cobalt | Cobalt | Promotor /Accelerator | 0.27 |
| | tbpb | Peroxyester (Free Radical Initiator) | Crosslinging Agent | 1.33 |
| Formulaion | Mod E-90655 | PBQ (Parabenzoquinone) | Cure Inhibitor | 0.25 |
| | omyacarb S | Calcium Carbonate | Mined Filler | 186.66 |
| | Dupont R-902 Tio2 | Pigment(titanium dioxide) / (rutile titanate) | Pigment | 1.25 |
| | coad 20 | Mold Release (zinc stearate) | Lubricant | 5 |
| | Cimbar 0.7 | Barium Sulfate | radiopacity agent A | / |
| | Cimbar 18 | Barium Sulfate | radiopacity agent B | / |
| | Cimbar 10 | Barium Sulfate | radiopacity agent C | / |
| | Tungsten | Tungsten | radiopacity agent D | / |
| | Huber 10 | Barium Sulfate | radiopacity agent E | / |
| | Huber 7 | Barium Sulfate | radiopacity agent F | / |
| | Huber 1 | Barium Sulfate | radiopacity agent G | / |
| | Am-09059 | Alkaline earth oxide | Thickener | 4.69 |
| | Probability of Detection | Probability of Detection | Probability of Detection | |
| | 1 mm cube | 1 mm cube | 1 mm cube | 0% |
| X-Ray Detectability Test | 2 mm cube | 2 mm cube | 2 mm cube | 0% |
| | 3.125 mm cube | 3.125 mm cube | 3.125 mm cube | 0% |
| | 4.5 mm cube | 4.5 mm cube | 4.5 mm cube | 0% |
| | | | | |
| Migration Test | Overall Migration (mg/dm2) | Overall Migration (mg/dm2) | Overall Migration (mg/dm2) | 1.5 |
| | Specific Migration of Barium (mg/kg) | Specific Migration of Barium (mg/kg) | Specific Migration of Barium (mg/kg) | / |

FIG. 3

| | | Radiopacity Agent A | | | | | | |
|---|---|---|---|---|---|---|---|---|
| | Ingredients (PHR) | | | | | | | |
| Formulaion | Resin A | 60 | 60 | 60 | 60 | 60 | 60 | 60 |
| | Resin B | / | / | / | / | / | / | / |
| | Resin C | / | / | / | / | / | / | / |
| | Resin D | / | / | / | / | / | / | / |
| | Resin E | / | / | / | / | / | / | / |
| | Low Profile Additive | 20 | 20 | 20 | 20 | 20 | 20 | 20 |
| | Shrink Control Additive | 20 | 20 | 20 | 20 | 20 | 20 | 20 |
| | Promotor / Accelerator | 0.27 | 0.27 | 0.27 | 0.27 | 0.27 | 0.27 | 0.27 |
| | Crosslinging Agent | 1 | 1.33 | 1.33 | 1.33 | 1.33 | 1.33 | 1.33 |
| | Cure Inhibitor | 0.25 | 0.25 | 0.25 | 0.25 | 0.25 | 0.25 | 0.25 |
| | Mined Filler | / | 34.5 | 93.35 | 130.65 | 149.38 | 168 | 177.4 |
| | Pigment | 1.25 | 1.25 | 1.25 | 1.25 | 1.25 | 1.25 | 1.25 |
| | Lubricant | 5 | 5 | 5 | 5 | 5 | 5 | 5 |
| | radiopacity agent A | 228.38 | 172 | 155 | 92.98 | 62 | 31 | 15.5 |
| | radiopacity agent B | / | / | / | / | / | / | / |
| | radiopacity agent C | / | / | / | / | / | / | / |
| | radiopacity agent D | / | / | / | / | / | / | / |
| | radiopacity agent E | / | / | / | / | / | / | / |
| | radiopacity agent F | / | / | / | / | / | / | / |
| | radiopacity agent G | / | / | / | / | / | / | / |
| | Thickener | 4.69 | 4.69 | 4.69 | 4.69 | 4.69 | 4.69 | 4.69 |
| X-Ray Detectability Test | Probability of Detection | | | | | | | |
| | 1mm cube | 90% | 78% | 54% | / | 25% | 2% | 64% |
| | 2 mm cube | 100% | 100% | 96% | / | 72% | 62% | 10% |
| | 3.125 mm cube | 100% | 100% | 100% | / | 84% | 100% | 74% |
| | 4.5 mm cube | 100% | 100% | 100% | / | 100% | 100% | 98% |
| Migration Test | Overall Migration (mg/kg) | 1.7 | / | 5 | <0.1 | / | / | / |
| | Specific Migration of Barium (mg/kg) | 0.03 | / | 0.02 | 00 | / | / | / |
| Properties | Tensile Strength (Mpa) | 38 | / | / | / | 38 | 36 | 43 |
| | Tensile Modulus (psi) | 12780 | / | / | / | 10281 | 10607 | 11780 |
| | Flex Strength (MPa) | 115 | / | / | / | 87 | 153 | 128 |
| | Flex Modulus (psi) | 11320 | / | / | / | 11000 | 12420 | 11038 |
| | IZOD | 330 | / | / | / | 475 | 474 | 364 |
| | Fiber Volume Fraction (%) | 15.06 | / | / | / | 12.41 | 12.47 | 13.53 |
| | Fiber Weight Fraction (%) | 20.4 | / | / | / | 16.29 | 16.94 | 18.58 |
| | Water Absorption (%) | 0.23 | / | / | / | 0.268 | 0.292 | 0.306 |
| | Residual Volatile Styrene | 0.2 | / | / | / | 0.3 | 0.3 | 0.4 |
| | Others | 26 | / | / | / | 25.3 | 23.3 | 15.2 |
| | Shrink (mil/in) | -0.4052 | / | / | / | -0.3789 | -0.4609 | -0.2469 |
| | Spiral Flow | N/A | / | / | / | 40 | 40 | N/A |
| | Gel Time (second) | N/A | / | / | / | 25 | 25 | N/A |
| | Cure Time (second) | N/A | / | / | / | 44 | 44 | N/A |

FIG. 4

Table 3

| | | Radiopacity Agent B | | | | | | | |
|---|---|---|---|---|---|---|---|---|---|
| | Ingredients (PHR) | | | | | | | | |
| Formulaion | Resin A | 60 | 60 | 60 | 60 | 60 | 60 | 60 | 60 |
| | Resin B | / | / | / | / | / | / | / | / |
| | Resin C | / | / | / | / | / | / | / | / |
| | Resin D | / | / | / | / | / | / | / | / |
| | Resin E | / | / | / | / | / | / | / | / |
| | Low Profile Additive | 20 | 20 | 20 | 20 | 20 | 20 | 20 | 20 |
| | Shrink Control Additive | 20 | 20 | 20 | 20 | 20 | 20 | 20 | 20 |
| | Promotor / Accelerator | 0.27 | 0.27 | 0.27 | 0.27 | 0.27 | 0.27 | 0.27 | 0.27 |
| | Crosslinging Agent | 1.33 | 1.33 | 1.33 | 1.33 | 1.33 | 1.33 | 1.33 | 1.33 |
| | Cure Inhibitor | 0.25 | 0.25 | 0.25 | 0.25 | 0.25 | 0.25 | 0.25 | 0.25 |
| | Mined Filler | / | 45.8 | 93.35 | 112 | 130.65 | 149.38 | 168 | 177.4 |
| | Pigment | 1.25 | 1.25 | 1.25 | 1.25 | 1.25 | 1.25 | 1.25 | 1.25 |
| | Lubricant | 5 | 5 | 5 | 5 | 5 | 5 | 5 | 5 |
| | radiopacity agent A | / | / | / | / | / | / | / | / |
| | radiopacity agent B | 310 | 232.3 | 155 | 124 | 93 | 62 | 31 | 15.5 |
| | radiopacity agent C | / | / | / | / | / | / | / | / |
| | radiopacity agent D | / | / | / | / | / | / | / | / |
| | radiopacity agent E | / | / | / | / | / | / | / | / |
| | radiopacity agent F | / | / | / | / | / | / | / | / |
| | radiopacity agent G | / | / | / | / | / | / | / | / |
| | Thickener | 4.69 | 4.69 | 4.69 | 4.69 | 4.69 | 4.69 | 4.69 | 4.69 |
| X-Ray DectectabilityTest | Probability of Detection | | | | | | | | |
| | 1 mm cube | 80% | 70% | 28% | 54% | 38% | 0% | 0% | 0% |
| | 2 mm cube | 100% | 94% | 100% | 96% | 78% | 48% | 6% | 12% |
| | 3.125 mm cube | 100% | 100% | 100% | 100% | 98% | 90% | 96% | 74% |
| | 4.5 mm cube | 100% | 100% | 100% | 100% | 100% | 100% | 100% | 98% |
| Migration Test | Overall Migration (mg/dm2) | <0.1 | / | 2.6 | / | <0.1 | / | / | / |
| | Specific Migration of Barium (mg/kg) | 0.03 | / | 0.01 | / | 0.02 | / | / | / |
| Properties | Tensile Strength (MPa) | 44 | 31 | 40 | 43 | 26 | 37 | 33 | 37 |
| | Tensile Modulus (psi) | 12650 | 11198 | 12210 | 11031 | 10236 | 11360 | 11004 | 11150 |
| | Flex Strength (MPa) | 137 | 115 | 123 | 180 | 112 | 116 | 126 | 114 |
| | Flex Modulus (psi) | 11950 | 11170 | 11930 | 11022 | 10568 | 11110 | 10910 | 10647 |
| | IZOD | 320 | 351 | 296 | 464 | 452 | 396 | 450 | 470 |
| | Fiber Volume Fraction (%) | 15.04 | 13.27 | 10.98 | 13.33 | 12.63 | 11.57 | 11.47 | 11.35 |
| | Fiber Weight Fraction (%) | 16.55 | 15.44 | 13.51 | 16.78 | 16.52 | 15.36 | 15.72 | 15.71 |
| | Water Absorption (%) | 0.27 | 0.23 | 0.25 | 0.22 | 0.24 | 0.27 | 0.25 | 0.26 |
| | Residual Volatile Styrene | 0.6 | 0.7 | 0.7 | 0.5 | 0.5 | 0.7 | 0.5 | 0.4 |
| | Others | 58.7 | 111.7 | 58.3 | 107 | 44.7 | 40 | 39.3 | 35.7 |
| | Shrink (mil/in) | -0.2528 | -0.4503 | -0.3838 | -0.2485 | -0.5864 | -0.4855 | -0.2329 | -0.237 |
| | Spiral Flow | 33.5 | 39.5 | 38 | 41.5 | 41 | 31 | 40 | 39 |
| | Gel Time (second) | 22 | 23 | 22 | 24 | 21 | 21 | 22 | 21 |
| | Cure Time (second) | 44 | 46 | 44 | 47 | 45 | 43 | 43 | 42 |

FIG. 5

Table 4

| | | Radiopacity Agent C |
|---|---|---|
| Formulaion | Ingredients (PHR) | |
| | Resin A | 60 |
| | Resin B | / |
| | Resin C | / |
| | Resin D | / |
| | Resin E | / |
| | Low Profile Additive | 20 |
| | Shrink Control Additive | 20 |
| | Promotor / Accelerator | 0.27 |
| | Crosslinging Agent | 1.33 |
| | Cure Inhibitor | 0.25 |
| | Mined Filler | 147.83 |
| | Pigment | 1.25 |
| | Lubricant | 5 |
| | radiopacity agent A | / |
| | radiopacity agent B | / |
| | radiopacity agent C | 61.5 |
| | radiopacity agent D | / |
| | radiopacity agent E | / |
| | radiopacity agent F | / |
| | radiopacity agent G | / |
| | Thickener | 4.69 |
| X-Ray Detectability Test | Probability of Detection | |
| | 1 mm cube | 0% |
| | 2 mm cube | 82% |
| | 3.125 mm cube | 98% |
| | 4.5 mm cube | 100% |
| Migration Test | Overall Migration (mg/dm2) | / |
| | Specific Migration of Barium (mg/kg) | / |
| Properties | Tensile Strength (MPa) | 34.3 |
| | Tensile Modulus (psi) | 11800 |
| | Flex Strength (MPa) | 156 |
| | Flex Modulus (psi) | 12800 |
| | IZOD | 500 |
| | Fiber Volume Fraction (%) | 13.53 |
| | Fiber Weight Fraction (%) | 17.5 |
| | Water Absorption (%) | 0.21 |
| | Residual Volatile Styrene | 0.4 |
| | Others | 20.5 |
| | Shrink(mil/in) | -0.2026 |
| | Spiral Flow | 41 |
| | Gel Time (Second) | 21 |
| | Cure Time (second) | 41 |

FIG. 6

Table 5

| | | Radiopacity Agent D | | | | | |
|---|---|---|---|---|---|---|---|
| | Ingredients (PHR) | | | | | | |
| Formulation | Resin A | 60 | 60 | 60 | 60 | 60 | 60 |
| | Resin B | / | / | / | / | / | / |
| | Resin C | / | / | / | / | / | / |
| | Resin D | / | / | / | / | / | / |
| | Resin E | / | / | / | / | / | / |
| | Low Profile Additive | 20 | 20 | 20 | 20 | 20 | 20 |
| | Shrink Control Additive | 20 | 20 | 20 | 20 | 20 | 20 |
| | Promotor / Accelerator | 0.27 | 0.27 | 0.27 | 0.27 | 0.27 | 0.27 |
| | Crosslinking Agent | 1.33 | 1.33 | 1.33 | 1.33 | 1.33 | 1.33 |
| | Cure Inhibitor | 0.25 | 0.25 | 0.25 | 0.25 | 0.25 | 0.25 |
| | Mineral Filler | 168 | 173.6 | 177.3 | 181 | 183 | 184.8 |
| | Pigment | 1.25 | 1.25 | 1.25 | 1.25 | 1.25 | 1.25 |
| | Lubricant | 5.00 | 5 | 5 | 5 | 5 | 5 |
| | radiopacity agent A | / | / | / | / | / | / |
| | radiopacity agent B | / | / | / | / | / | / |
| | radiopacity agent C | / | / | / | / | / | / |
| | radiopacity agent D | 79 | 55.5 | 39.5 | 23.6 | 15.7 | 8 |
| | radiopacity agent E | / | / | / | / | / | / |
| | radiopacity agent F | / | / | / | / | / | / |
| | radiopacity agent G | / | / | / | / | / | / |
| | Thickener | 4.69 | 4.69 | 4.69 | 4.69 | 4.69 | 4.69 |
| X-Ray Detectability Test | Probability of Detection | | | | | | |
| | 1 mm cube | 28% | 24% | 6% | 0% | 0% | 0% |
| | 2 mm cube | 100% | 82% | 86% | 34% | 8% | 8% |
| | 3.125 mm cube | 100% | 100% | 100% | 94% | 78% | 44% |
| | 4.5 mm cube | 100% | 100% | 100% | 100% | 100% | 96% |
| Migration Test | Overall Migration (mg/dm2) | <0.1 | / | / | / | / | / |
| | Specific Migration of Barium (mg/kg) | N/A | / | / | / | / | / |
| Properties | Tensile Strength (MPa) | 50 | 47 | 41 | 36 | 43 | 50 |
| | Tensile Modulus (psi) | 10555 | 11680 | 11559 | 11115 | 11180 | 11590 |
| | Flex Strength (MPa) | 163 | 157 | 121 | 149 | 153 | 145 |
| | Flex Modulus (psi) | 12340 | 11830 | 11180 | 11230 | 11530 | 11660 |
| | IZOD | 604 | 619 | 554 | 387 | 576 | 435 |
| | Fiber Volume Fraction (%) | 14.35 | 13.13 | 12.4 | 14.8 | 13.35 | 13.78 |
| | Fiber Weight Fraction (%) | 15.47 | 15.23 | 15.34 | 19.23 | 17.62 | 18.62 |
| | Water Absorption (%) | 0.22 | 0.34 | 0.28 | 0.27 | 0.33 | 0.28 |
| | Residual Volatile Styrene | 0.6 | 0.3 | 0.4 | 0.2 | 0.3 | 0.2 |
| | Total | 75 | 78.7 | 19.8 | 45.7 | 53 | 40.7 |
| | Shrink (%) | -0.1058 | -0.2838 | -0.397 | -0.2985 | -0.3912 | -0.4092 |
| | Spiral Flow | 37 | 32.5 | 35.5 | 37 | N/A | 33.5 |
| | Gel Time (second) | 20 | 15 | N/A | 22 | N/A | 21 |
| | Cure Time (second) | 42 | 42 | N/A | 45 | N/A | 45 |

FIG. 7

Table 6

| | | Radiopacity Agent E | | | | | | | | | | |
|---|---|---|---|---|---|---|---|---|---|---|---|---|
| | Ingredients (PHR) | | | | | | | | | | | |
| Formulation | Resin A | 60 | 60 | 60 | 60 | 60 | 60 | 60 | 60 | 60 | 60 | 60 |
| | Resin B | / | / | / | / | / | / | / | / | / | / | / |
| | Resin C | / | / | / | / | / | / | / | / | / | / | / |
| | Resin D | / | / | / | / | / | / | / | / | / | / | / |
| | Resin E | / | / | / | / | / | / | / | / | / | / | / |
| | Low Profile Additive | 20 | 20 | 20 | 20 | 20 | 20 | 20 | 20 | 20 | 20 | 20 |
| | Shrink Control Additive | 20 | 20 | 20 | 20 | 20 | 20 | 20 | 20 | 20 | 20 | 20 |
| | Promotor / Accelerator | 0.27 | 0.27 | 0.27 | 0.27 | 0.27 | 0.27 | 0.27 | 0.27 | 0.27 | 0.27 | 0.27 |
| | Crosslinging Agent | 1.33 | 1.33 | 1.33 | 1.33 | 1.33 | 1.33 | 1.33 | 1.33 | 1.33 | 1.33 | 1.33 |
| | Cure Inhibitor | 0.25 | 0.25 | 0.25 | 0.25 | 0.25 | 0.25 | 0.25 | 0.25 | 0.25 | 0.25 | 0.25 |
| | Mined Filler | / | 46.8 | 93.35 | 112 | 126 | 130.65 | 140 | 147.83 | 160 | 168 | 177.4 |
| | Pigment | 1.25 | 1.25 | 1.25 | 1.25 | 1.25 | 1.25 | 1.25 | 1.25 | 1.25 | 1.25 | 1.25 |
| | Lubricant | 5 | 5 | 5 | 5 | 5 | 5 | 5 | 5 | 5 | 5 | 5 |
| | radiopacity agent A | / | / | / | / | / | / | / | / | / | / | / |
| | radiopacity agent B | / | / | / | / | / | / | / | / | / | / | / |
| | radiopacity agent C | / | / | / | / | / | / | / | / | / | / | / |
| | radiopacity agent D | / | / | / | / | / | / | / | / | / | / | / |
| | radiopacity agent E | 310 | 292.3 | 255 | 123.56 | 100.64 | 92.98 | 77.5 | 61.5 | 46.5 | 31 | 15.5 |
| | radiopacity agent F | / | / | / | / | / | / | / | / | / | / | / |
| | radiopacity agent G | / | / | / | / | / | / | / | / | / | / | / |
| | Thickener | 4.69 | 4.69 | 4.69 | 4.69 | 4.69 | 4.69 | 4.69 | 4.69 | 4.69 | 4.69 | 4.69 |
| X-Ray Detectability Test | Probability of Dectection | | | | | | | | | | | |
| | 1 mm cube | 58% | 60% | 12% | 22% | 22% | 0% | 2% | 4% | 0% | 0% | 0% |
| | 2 mm cube | 100% | 93% | 96% | 84% | 48% | 92% | 54% | 84% | 75% | 34% | 0% |
| | 3.125 mm cube | 100% | 100% | 98% | 100% | 98% | 100% | 94% | 98% | 98% | 64% | 62% |
| | 4.5 mm cube | 100% | 100% | 100% | 100% | 100% | 100% | 100% | 100% | 100% | 100% | 88% |
| Migration Test | Overall Migration (mg/dm2) | / | / | / | / | / | / | / | / | / | / | / |
| | Specific Migration of Barium (mg/kg) | / | / | / | / | / | / | / | / | / | / | / |
| Properties | Tensile Strength (Mpa) | 44.1 | 32 | 42 | 37 | / | 32 | 34 | 36.1 | / | / | / |
| | Tensile Modulus (psi) | 12800 | 10102 | 11710 | 10874 | / | 10460 | 10163 | 11000 | / | / | / |
| | Flex Strength (MPa) | 139 | 154 | 129 | 192 | / | 152 | 122 | 124 | / | / | / |
| | Flex Modulus (psi) | 11560 | 10575 | 11150 | 11040 | / | 10174 | 11040 | 10200 | / | / | / |
| | IZOD | 581 | 405 | 362 | 505 | / | 459 | 559 | 368 | / | / | / |
| | Fiber Volume Fraction (%) | 11.14 | 11.03 | 13.82 | 12.9 | / | 11.3 | 11.41 | 13.50 | / | / | / |
| | Fiber Weight Fraction (%) | 14.91 | 32.5 | 16.54 | 15.93 | / | 14.52 | 14.78 | 18.02 | / | / | / |
| | Water Absorption (%) | 0.26 | 0.25 | 0.28 | 0.25 | / | 0.22 | 0.22 | 0.32 | / | / | / |
| | Residual Volatile Styrene | 0.4 | 0.5 | 0.3 | 0 | / | 0.5 | 0.4 | 0.5 | / | / | / |
| | Others | 62 | 50.7 | 26.7 | 41 | / | 102 | 46.3 | 4.2 | / | / | / |
| | Shrink (mil/in) | -0.322 | -0.5659 | -0.4199 | -0.4792 | / | 0 | 0 | | / | / | / |
| | Spiral Flow | 25 | 33.5 | 31.5 | 37.5 | / | 40.5 | 41 | 39 | / | / | / |
| | Gel Time (second) | 19 | 19 | 19 | N/A | / | 21 | 20 | 23 | / | / | / |
| | Cure Time (second) | 38 | 42 | 36 | N/A | / | 43 | 41 | 55 | / | / | / |

FIG. 8

Table 7

| | | Radiopacity Agent F | | | | | |
|---|---|---|---|---|---|---|---|
| | Ingredients (PHR) | | | | | | |
| Formulation | Resin A | 60 | 60 | 60 | 60 | 60 | 60 |
| | Resin B | / | / | / | / | / | / |
| | Resin C | / | / | / | / | / | / |
| | Resin D | / | / | / | / | / | / |
| | Resin E | / | / | / | / | / | / |
| | Low Profile Additive | 20 | 20 | 20 | 23 | 20 | 20 |
| | Shrink Control Additive | 20 | 20 | 20 | 20 | 20 | 20 |
| | Promotor / Accelerator | 0.27 | 0.27 | 0.27 | 0.27 | 0.27 | 0.27 |
| | Crosslinging Agent | 1.33 | 1.33 | 1.33 | 1.33 | 1.33 | 1.33 |
| | Cure inhibitor | 0.25 | 0.25 | 0.25 | 0.25 | 0.25 | 0.25 |
| | Mined Filler | / | 93.35 | 147.83 | 160 | 168 | 177.4 |
| | Pigment | 1.25 | 1.25 | 1.25 | 1.25 | 1.25 | 1.25 |
| | Lubricant | 5 | 5 | 5 | 5 | 5 | 5 |
| | radiopacity agent A | / | / | / | / | / | / |
| | radiopacity agent B | / | / | / | / | / | / |
| | radiopacity agent C | / | / | / | / | / | / |
| | radiopacity agent D | / | / | / | / | / | / |
| | radiopacity agent E | / | / | / | / | / | / |
| | radiopacity agent F | 310 | 155 | 61.5 | 46.5 | 31 | 15.5 |
| | radiopacity agent G | / | / | / | / | / | / |
| | Thickener | 4.69 | 4.69 | 4.69 | 4.69 | 4.69 | 4.69 |
| X-Ray Detectability Test | Probability of Detection | | | | | | |
| | 1 mm cube | 66% | 4% | 0% | 0% | 0% | 0% |
| | 2 mm cube | 100% | 92% | 48% | 34% | 34% | 2% |
| | 3.125 mm cube | 100% | 100% | 98% | 84% | 76% | 60% |
| | 4.5 mm cube | 100% | 100% | 100% | 100% | 98% | 98% |
| Migration Test | Overall Migration (mg/dm2) | / | / | 0.2 | / | / | / |
| | Specific Migration of Barium (mg/kg) | / | / | <0.01 | / | / | / |
| Properties | Tensile Strength (MPa) | 62 | 38 | / | / | / | / |
| | Tensile Modulus (psi) | 12470 | 11400 | / | / | / | / |
| | Flex Strength (MPa) | 153 | 130 | / | / | / | / |
| | Flex Modulus (psi) | 11720 | 11030 | / | / | / | / |
| | IZOD | 542 | 471 | / | / | / | / |
| | Fiber Volume Fraction (%) | 15.23 | 12.73 | / | / | / | / |
| | FiberWeight Fraction(%) | 16.21 | 15.3 | / | / | / | / |
| | Water Absorption (%) | 0.25 | 0.29 | / | / | / | / |
| | Residual Volatile Styrene | 0.7 | 1.7 | / | / | / | / |
| | Others | 33.3 | 44 | / | / | / | / |
| | Shrink (mil/in) | -0.2173 | -0.2871 | / | / | / | / |
| | Spiral Flow | / | 37.5 | / | / | / | / |
| | Gel Time (second) | 18 | 22 | / | / | / | / |
| | Cure Time (second) | 40 | 40 | / | / | / | / |

FIG. 9

Table 8

| | | Radiopacity Agent G | | | | | |
|---|---|---|---|---|---|---|---|
| | Ingredients (PHR) | | | | | | |
| Formulation | Resin A | 60 | 60 | 60 | 60 | 60 | 60 |
| | Resin B | / | / | / | / | / | / |
| | Resin C | / | / | / | / | / | / |
| | Resin D | / | / | / | / | / | / |
| | Resin E | / | / | / | / | / | / |
| | Low Profile Additive | 20 | 20 | 20 | 20 | 20 | 20 |
| | Shrink Control Additive | 20 | 20 | 20 | 20 | 20 | 20 |
| | Promotor / Accelerator | 0.27 | 0.27 | 0.27 | 0.27 | 0.27 | 0.27 |
| | Crosslinging Agent | 1.33 | 1.33 | 1.33 | 1.33 | 1.33 | 1.33 |
| | Cure Inhibitor | 0.25 | 0.25 | 0.25 | 0.25 | 0.25 | 0.25 |
| | Mined Filler | / | 93.35 | 149.38 | 160 | 168 | 177.4 |
| | Pigment | 1.25 | 1.25 | 1.25 | 1.25 | 1.25 | 1.25 |
| | Lubricant | 5 | 5 | 5 | 5 | 5 | 5 |
| | radiopacity agent A | / | / | / | / | / | / |
| | radiopacity agent B | / | / | / | / | / | / |
| | radiopacity agent C | / | / | / | / | / | / |
| | radiopacity agent D | / | / | / | / | / | / |
| | radiopacity agent E | / | / | / | / | / | / |
| | radiopacity agent F | / | / | / | / | / | / |
| | radiopacity agent G | 310 | 155 | 62 | 46.5 | 31 | 15.5 |
| | Thickener | 4.69 | 4.69 | 4.69 | 4.69 | 4.69 | 4.69 |
| X-Ray Detectability Test | Probability of Detection | | | | | | |
| | 1 mm cube | 66% | 16% | 0% | 0%. | 0% | 0% |
| | 2 mm cube | 100% | 100% | 38% | 22% | 38% | 0% |
| | 3.125 mm cube | 100% | 100% | 98% | 76% | 72% | 58% |
| | 4.5 mm cube | 100% | 100% | 100% | 100% | 98% | 94% |
| Migration Test | Overall Migration (mg/dm2) | / | / | / | / | / | / |
| | Specific Migration of Barium (mg/kg) | / | / | / | / | / | / |
| Properties | Tensile Strength (Mpa) | 38 | 42 | / | / | / | / |
| | Tensile Modulus (psi) | 11400 | 12160 | / | / | / | / |
| | Flex Strength (MPa) | 130 | 121 | / | / | / | / |
| | Flex Modulus(psi) | 11030 | 11740 | / | / | / | / |
| | IZOD | 471 | 458 | / | / | / | / |
| | Fiber Volume Fraction (%) | 12.73 | 12.1 | / | / | / | / |
| | Fiber Weight Fraction (%) | 15.3 | 14.6 | / | / | / | / |
| | Water Absorption (%) | 0.29 | 0.27 | / | / | / | / |
| | Residual Volatile Styrene | 1.7 | 0.6 | / | / | / | / |
| | Others | 44 | 28 | / | / | / | / |
| | Shrirsk (millin) | -0.2871 | -0.2346 | / | / | / | / |
| | Spiral Flow | 37.5 | 38.5 | / | / | / | / |
| | Gel Time (second) | 22 | 30 | / | / | / | / |
| | Cure Time (second) | 40 | 50 | / | / | / | / |

FIG. 10

Table 9

| | | Radiopacity Agent Blends A, B, D | | | | | | | | | |
|---|---|---|---|---|---|---|---|---|---|---|---|
| | Ingredients (PHR) | | | | | | | | | | |
| Formulation | Resin A | 60 | 60 | 60 | / | / | / | / | 60 | 60 | 60 |
| | Resin B | / | / | / | 60 | / | / | / | / | / | / |
| | Resin C | / | / | / | / | 60 | / | / | / | / | / |
| | Resin D | / | / | / | / | / | 60 | / | / | / | / |
| | Resin E | / | / | / | / | / | / | 60 | / | / | / |
| | Low Profile Additive | 20 | 20 | 20 | 20 | 20 | 20 | 20 | 20 | 20 | 20 |
| | Shrink Control Additive | 20 | 20 | 20 | 20 | 20 | 20 | 20 | 20 | 20 | 20 |
| | Promoter/ Accelerator | 0.27 | 0.27 | 0.27 | 0.27 | 0.27 | 0.27 | 0.27 | 0.27 | 0.27 | 0.27 |
| | Crosslinging Agent | 1.33 | 1.33 | 1.33 | 1.33 | 1.33 | 1.33 | 1.33 | 1.33 | 1.33 | 1.33 |
| | Cure Inhibitor | 0.25 | 0.25 | 0.25 | 0.25 | 0.25 | 0.25 | 0.25 | 0.25 | 0.25 | 0.25 |
| | Mineral Filler | 93.35 | 93.35 | 93.35 | 93.35 | 93.35 | 93.35 | 93.35 | 93.35 | 131.37 | 131.37 |
| | Pigment | 1.25 | 1.25 | 1.25 | 1.25 | 1.25 | 1.25 | 1.25 | 1.25 | 1.25 | 1.25 |
| | Lubricant | 5 | 5 | 5 | 5 | 5 | 5 | 5 | 5 | 5 | 5 |
| | radiopacity agent A | 19.38 | 46.5 | 77.5 | 77.5 | 77.5 | 77.5 | 77.5 | 108.5 | / | / |
| | radiopacity agent B | 135.63 | 108.5 | 77.5 | 77.5 | 77.5 | 77.5 | 77.5 | 46.5 | 78.08 | 125.7 |
| | radiopacity agent C | / | / | / | / | / | / | / | / | / | / |
| | radiopacity agent D | / | / | / | / | / | / | / | / | 39.54 | 8.4 |
| | radiopacity agent E | / | / | / | / | / | / | / | / | / | / |
| | radiopacity agent F | / | / | / | / | / | / | / | / | / | / |
| | radiopacity agent G | / | / | / | / | / | / | / | / | / | / |
| | Thickener | 4.69 | 4.69 | 4.69 | 4.69 | 4.69 | 4.69 | 4.69 | 4.69 | 4.69 | 4.69 |
| X-Ray Detectability Test | Probability of Detection | | | | | | | | | | |
| | 1 mm cube | / | 72% | 86% | / | / | / | / | 48% | 60% | 36% |
| | 2 mm cube | 100% | 100% | 98% | / | / | / | / | 98% | 96% | 85% |
| | 3.325 mm cube | 100% | 100% | 100% | / | / | / | / | 100% | 100% | 98% |
| | 4.5 mm cube | 100% | 100% | 100% | / | / | / | / | 100% | 100% | 100% |
| Migration Test | Overall Migration (mg/dm2) | / | / | / | / | / | / | / | / | / | / |
| | Specific Migration of Barium (mg/kg) | / | / | / | / | / | / | / | / | / | / |

FIG. 11

| Control 5336 Formulation | | | | |
|---|---|---|---|---|
| Item | Material | Type | Density | %BOT |
| 1 | 6585 | R | 1.11 | 60 |
| 2 | 505 | R | 1 | 20 |
| 3 | 63004 | R | 1 | 20 |
| 4 | Tbpb | C | 0.95 | 1.3333 |
| 5 | mod E | A | 1 | 0.25 |
| 6 | cobalt | A | 1.1 | 0.2667 |
| 7 | coad 20 | A | 1.04 | 5 |
| 8 | Dupont tiO2 | F | 3.7 | 1.25 |
| 9 | omya carb 5 | F | 2.71 | 186.66 |
| 10 | AM 9059 | A | 1.65 | 4.69 |

FIG. 12

Table 10

| Formulation ID | 1 | | | | | | 5 | | | | | | 9 | | | | | |
|---|---|---|---|---|---|---|---|---|---|---|---|---|---|---|---|---|---|---|
| Formulation Info | Barium size 1, 20% | | | | | | Barium size 7, 20% | | | | | | Barium size 10, 20% | | | | | |
| Cube size | 1 | 2 | 3.125 | 4.5 | 5.375 | 6.5 | 1 | 2 | 3.125 | 4.5 | 5.375 | 6.5 | 1 | 2 | 3.125 | 4.5 | 5.375 | 6.5 |
| Probability of detection | 0% | 38% | 98% | 100% | 100% | 100% | 0% | 48% | 98% | 100% | 100% | 100% | 4% | 64% | 98% | 100% | 100% | 100% |
| Formulation ID | 2 | | | | | | 6 | | | | | | 10 | | | | | |
| Formulation Info | Barium size 1, 15% | | | | | | Barium size 7, 15% | | | | | | Barium size 10, 15% | | | | | |
| Cube size | 1 | 2 | 3.125 | 4.5 | 5.375 | 6.5 | 1 | 2 | 3.125 | 4.5 | 5.375 | 6.5 | 1 | 2 | 3.125 | 4.5 | 5.375 | 6.5 |
| Probability of detection | 0% | 22% | 76% | 100% | 100% | 100% | 0% | 34% | 84% | 100% | 100% | 100% | 0% | 76% | 96% | 100% | 100% | 100% |
| Formulation ID | 3 | | | | | | 7 | | | | | | 11 | | | | | |
| Formulation Info | Barium size 1, 10% | | | | | | Barium size 7, 10% | | | | | | Barium size 10, 10% | | | | | |
| Cube size | 1 | 2 | 3.125 | 4.5 | 5.375 | 6.5 | 1 | 2 | 3.125 | 4.5 | 5.375 | 6.5 | 1 | 2 | 3.125 | 4.5 | 5.375 | 6.5 |
| Probability of detection | 0% | 38% | 72% | 98% | 100% | 100% | 0% | 34% | 76% | 98% | 100% | 100% | 0% | 34% | 64% | 100% | 100% | 100% |
| Formulation ID | 4 | | | | | | 8 | | | | | | 12 | | | | | |
| Formulation Info | Barium size 1, 5% | | | | | | Barium size 7, 5% | | | | | | Barium size 10, 5% | | | | | |
| Cube size | 1 | 2 | 3.125 | 4.5 | 5.375 | 6.5 | 1 | 2 | 3.125 | 4.5 | 5.375 | 6.5 | 1 | 2 | 3.125 | 4.5 | 5.375 | 6.5 |
| Probability of detection | 0% | 0% | 58% | 94% | 100% | 100% | 0% | 2% | 60% | 98% | 100% | 100% | 0% | 0% | 62% | 88% | 100% | 100% |
| Formulation ID | 5336 Tray Company Production Material | | | | | | | | | | | | 5336 Tray Company Production Material (Pack First Inc) | | | | | |
| Formulation Info | No Barium | | | | | | | | | | | | No Barium | | | | | |
| Cube size | 1 | 2 | 3.125 | 4.5 | 5.375 | 6.5 | 8 | 12 | 16 | | | | 1 | 2 | 3.125 | 4.5 | 5.375 | 6.5 |
| Probability of detection | 0% | 0% | 10% | 48% | 98% | 92% | 100% | 100% | 100% | | | | 0% | 0% | 0% | 0% | 0% | 0% |

FIG. 13

X-RAY AND METAL DETECTABLE THERMOSET COMPOSITES FOR USE IN FOOD AND PHARMACEUTICAL MANUFACTURING

CROSS-REFERENCE TO RELATED APPLICATIONS

This application claims benefit of U.S. Patent Application No. 62/263,351, filed Dec. 4, 2015, and International Patent Application No. PCT/US2016/064954 filed Dec. 5, 2016, the disclosures of which are incorporated herein by reference in their entirety.

FIELD

The present subject matter relates to X-ray detectable and metal detectable thermoset composite materials. These materials can be formed into trays, sheets, or other forms that are suitable for use in food or pharmaceutical processing or manufacturing.

BACKGROUND

Reinforced plastic composite trays are commonly used in food and pharmaceutical manufacturing. The compression molded trays are made using sheet molding compounds with match metal die molds. Food regulations require that trays have some type of detection component so that manufacturers using these trays can segregate materials should breakage occur.

When a foodstuff or pharmaceutical is manufactured in a reinforced plastic composite tray, the foodstuff or pharmaceutical is separated from the reinforced plastic composite tray by dumping the ingredients onto a moving sanitary beltway or into a sanitary tray or other vessel for movement down a beltway or the like. While the SMC (sheet-molded composite or sheet molding compound) used in the reinforced plastic composite tray may exhibit excellent mechanical properties such as impact resistance, heat resistance and the like, the foodstuff or pharmaceutical nevertheless may contain fragments of the reinforced plastic composite tray if the reinforced plastic composite tray was compromised or broken during the automated production or transfer process.

If the reinforced plastic composite tray expels a fragment is greater than 0.275" (7 mm) in length along any axis, the product from which the reinforced plastic composite tray was ejected would be considered adulterated by the United States Food and Drug Administration (FDA) and could not be sold. However, even fragments having a length of less than having a length of less than 7 mm as measured along any axis may present a danger to a subject ingesting the foodstuff or pharmaceutical. In order to avoid being considered adulterated or otherwise prevent danger or harm, the tray fragments must be detected and subsequently removed from the foodstuff or pharmaceutical to prevent harm to consumers.

Metal detectors may be used in the manufacturing process to detect metallic contaminants that arise from routine wear and tear of machines. However, standard metal detectors are not capable of detecting contaminants that come from plastic components such as the reinforced plastic composites used in the manufacturing process. X-ray detectors similarly have not been able to detect previous forms of reinforced plastic composites. The introduction of additives containing elements with an atomic number greater than carbon (At. No.=6) allows for X-ray or Metal detection of the reinforced plastic composite.

While industry standard practices are to detect and remove fragments of materials, including fragments of reinforced plastic composites utilized in the manufacture of foodstuff and/or pharmaceuticals, of 7 mm or longer, there exists a need for reinforced plastic composites capable of detection by an X-ray or metal detector even at very small sizes, for example, fragments having a length of less than 7 mm along any axis, including any cross-section dimension.

SUMMARY

The present subject matter relates to X-ray and metal detectable thermoset composites. The X-ray or metal detectable materials are especially useful in the manufacture and processing of foodstuffs and pharmaceuticals to reduce or limit the risk of contamination by the materials, which, when broken, splintered or otherwise separated from a larger component, may contaminate the food or pharmaceutical product.

According to the present subject matter, provided is an X-ray detectable material. The X-ray detectable material may comprise or consist of one or more of the following: a resin; one or more low profile additives; an accelerator; a crosslinking agent; a cure inhibitor; a mineral filler; a rutile titanate; a lubricant; a thickener; a radiopacity agent; and/or a reinforcement material.

Each resin; one or more low profile additive; an accelerator; a crosslinking agent; a cure inhibitor; a mineral filler; a rutile titanate; a lubricant; a thickener; a radiopacity agent; and/or a reinforcement material may be included in the X-ray detectable material in any amount. In this regard, any single component may be present in an amount of about 0.01 to 100%, as well as any integer or portion thereof in between.

According to the present subject matter provided is a metal detectable material.

The metal detectable material may comprise or consist of one or more of the following: a resin; one or more low profile additives; an accelerator; a crosslinking agent; a cure inhibitor; a mineral filler; a rutile titanate; a lubricant; a thickener; a metal additive; and/or a reinforcement material in any amount. In this regard, any single component may be present in an amount of about 0.01 to 100%, as well as any integer or portion thereof in between.

Also provided is a method of detecting a contaminant in a foodstuff or a pharmaceutical product. The method may comprise or consist of an X-ray detector or metal detector scanning the foodstuff or pharmaceutical product. The method may further comprise detecting a metal detectable or X-ray detectable material in which the detectable material signifies a contaminant in the foodstuff or pharmaceutical product. Pursuant to the detection of the contaminant, the method optionally further comprises discarding the contaminated foodstuff or pharmaceutical product. According to the methods provided, the X-ray detectable material being detected may comprise or consist of one or more of the following: a resin; a low profile additive; an accelerator; a crosslinking agent; a cure inhibitor; a mineral filler; a rutile titanate; a lubricant; a thickener; a radiopacity agent; and/or a reinforcement material.

BRIEF DESCRIPTION OF THE FIGURES

FIG. 3 is a table of a thermoset composite formulations.

FIGS. 4-11 are tables 2-9, respectively, of X-ray detectable thermoset composite formulations.

FIG. 12 is a table of control thermoset composite material.

FIG. 13 is a table of barium loaded thermoset composites tested in Example 3.

DETAILED DESCRIPTION

Figure 1:
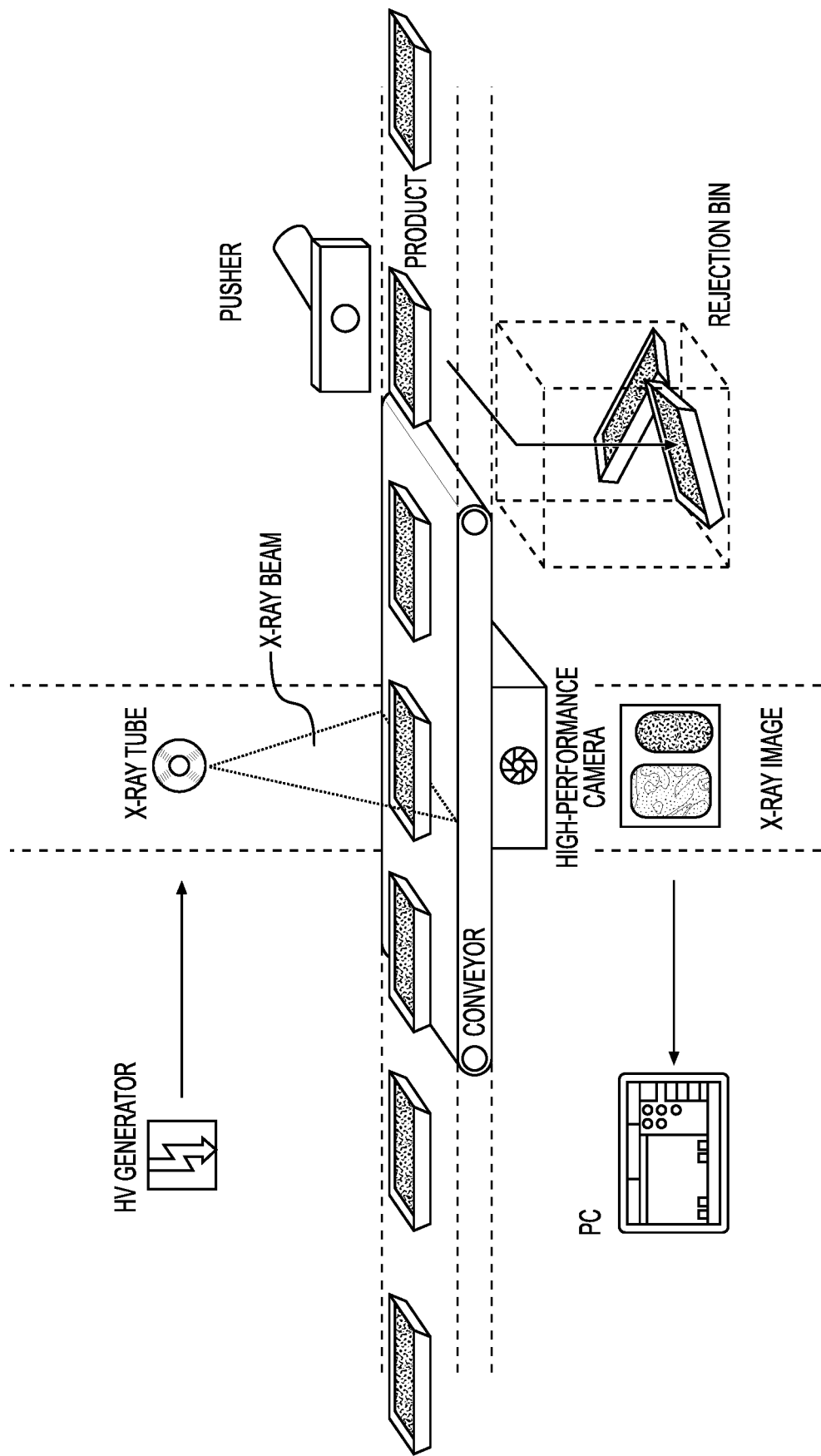
FIG. 1 is a schematic representation of an X-ray inspection according to the present subject matter.

The term "about" as used herein refers to a quantity, level, value, dimension, size, or amount that varies to some extent based on the context in which it is used. For example, such variation can be by as much as 5%. At the least, each numerical parameter can be construed in light of the number of reported significant digits and by applying ordinary rounding techniques.

As used herein, the term "resin" refers to any resin that is convertible into a polymer, including, for example and without limitations, polyester, vinyl ester, phenol formaldehyde (referred to as Bakelite), nylon, polystyrene, polypropylene, polyacrylonitrile, silicone, and polycarbonates. One example of resin according to the present subject matter includes, e.g., an unsaturated polyester resin styrene mixture such as AROPOL Q-6585, which is available from the Ashland Chemical Company and contains about 70 percent by weight polyester resin. Other resins that may be included in the present thermoset composite formulations include POLYLITE 31009 (a Terephthalic Polyester Resin), POLYLITE 31610 (an Isophthalic Polyester Resin), DERAKANE 780 (an Epoxy Novalac Vinyl Ester Resin), and MR14029 (Neopentylglycol Isophthalic Resin).

As used herein, "low profile additive" refers to an additive included in the detectable material to reduce the shrinkage of the material and increase surface smoothness. The low profile additive may be a thermoset or thermoplastic polymer. Examples of suitable thermoset or thermoplastic polymers as low profile additives that may be used include polycaprolactones, polyurethanes, poly(vinyl acetate)s, polystyrene and styrene copolymers, and vinyl chloride-vinyl acetate copolymers. One example of a low profile additive according to the present subject matter is NEULON 505 (Ashland), which is a thermoset or thermoplastic polyester based low profile additive for structural and zero shrink applications. Another example of a low profile additive according to the present subject matter is MR-63004, which is non carboxylates polystyrene at 34% solids in styrene monomer (also available from the Ashland Chemical Company).

The term "accelerator" refers to a material added to help reduce cure times. Accelerators, when used, may act as additional cure catalysts for the unsaturated resins. Suitable compounds useable as accelerators include, but are not limited to, cobalt compounds such as cobalt naphthenate and octanoate.

As used herein, "crosslinking agent" refers to a molecule that is part of the polymeric crosslink after the crosslinking reaction, whereas a crosslinking catalyst is a molecule, which participates in the crosslinking reaction, but is not part of the resulting polymeric crosslink. According to the present subject matter, the crosslinking agent may be one or more of t-butylperbenzoate (TBPB), t-butylperoxide-3,5,5 trimethylhexanoate, 2,5-di-benzoylperoxy-2,5 dimethyl-hexane, di-tributyl peroxyterephthalate, 1, 1-di-tributylperoxy-3,5,5-trimethyl cyclohexane, 2-methyl-2-cumylperoxy-5-ketotetrahydrofuran, 3-tributylperoxy-3-phenylphthalide and 3-t-butylperoxy-3 (p-chlorphenyl) phthalide. The thermoset composites include a crosslinking agent, whereas a thermoplastic material does not include a crosslinking agent.

As used herein, "cure inhibitor" refers to a substance that may retard the polymerization of an unsaturated polyester resin in the detectable material. Suitable cure inhibitors include, for example, substituted phenolic derivatives such as hydroquinone, quinone, and para-benzoquinone. Quaternary ammonium salts, especially of strong bases such as trimethyl benzylammonium chloride or bromide, are also suitable cure inhibitors. An example of a cure inhibitor according to the present subject matter is IN-90655. IN-90655 is 5% p-benzoquinone (PBQ) from Chromoflo Technologies, Ashtabula Ohio.

The phrase "mineral filler" or "mineral additive" refers to any filler or additive for polymer resins. One example of a mineral filler, according to the present subject matter, is ground calcium carbonate (GCC). According to the present subject matter, OMYCARB 5 (OMYA Inc. North America) may be used as the GCC.

As used herein, "rutile" is a mineral composed primarily of titanium dioxide ($TiO_2$) and is the most common natural form of $TiO_2$, along with its two less abundant polymorphs anatase (having a tetragonal, pseudo-octahedral morphology), and brookite, an orthorhombic mineral. Rutile is a desirable polymorph of $TiO_2$ because it has the lowest molecular volume of the three polymorphs of $TiO_2$ (i.e., rutile, brookite, anatase), hence the highest density. Rutile has among the highest refractive indices of any known mineral.

"Rutile titanate(s)," also referred to as "rutile titanate pigments," are pigments that include a rutile (titanium dioxide, $TiO_2$) crystal structure and at least two metal oxides. Typically, rutile titanate pigments obtain color by incorporating a color-producing transition metal ion into the rutile crystal structure of the host oxide, e.g., titanium dioxide (rutile). Additionally, the rutile titanates can include metals, such as antimony, tungsten, or niobium. Rutile titanates are chemically neutral, which is desirable to minimize decomposition where such a pigment is to be included in a polycarbonate-based matrix. An example of a rutile titanate according to the present subject matter includes DUPONT R-902 $TiO_2$.

The term "lubricant" may refer to any solid or non-solid lubricant commonly used in molded or extruded polymer applications, including for example, a metallic stearate such as that of calcium, magnesium or zinc; an organic derivative of stearic acid; or stearic acid itself. Zinc stearate, known commercially as COAD®20, is an example of a lubricant according to the present subject matter. In this regard, preferred lubricants include those with moderately high bulk density for improved dispersion that leads to faster and more uniform mixing. In addition, the lubricant helps control viscosity.

A "thickener" according to the present subject matter refers to a component in the detectable material that is suitable to act as a chemical thickener dispersion for polyester molding. Available magnesium oxide dispersions are particularly useful thickeners according to the present subject matter. A non-limiting example of a thickener according to the present subject matter is ACCUMAG® AM-09059.

As used herein, "radiopacity agent" refers to one or more agent capable of stopping or reducing the passage of X-rays. Any radiopacity agent may be employed in the present X-ray detectable material. Suitable radiopacity agents according to the present subject matter include, for example, Barium Sulfate, Bismuth Subcarbonate, Bismuth Oxychloride, Bismuth Trioxide, Tungsten and Eriez PolyMag® Additives.

The radiopaciaty agents may be referred to herein by their tradenames or by other short hand. For example, CIMBAR® 0.7 is available as CIMBAR® BF from CIMBAR® preformance materials. CIMBAR® 18 is available as BARA-WEIGHT 50. CIMBAR® 10 is available as BARIMITE 200. Tungsten is available as TECHNON® Powder. Huber 10 is available as HUBERITE® 10. Huber 7 is available as HUBERITE® 7. Huber 1 is available as HUBERITE® 1.

In the case of Barium Sulfate, HUBERITE®, CIMBAR® or other Barium Sulfate may be utilized. The Barium Sulfate may be included in the formulation of the X-ray detectable material in any particle size. For example, if the radiopacity agent is Barium Sulfate or the like, it may have a particle size of, for example, 0.68, 1, 2, 3, 4, 5, 6, 7, 8, 9, 10, 11, 12, 13, 14, 15, 16, 17 or 18 µm, or mixtures thereof. The radiopacity agent may include more than one particle size of the agent. For example, a combination of CIMBAR® 0.7 and CIMBAR® 18 may be used. Additionally, a combination of two different radiopacity agents may also be used. For example, a combination of barium sulfate and tungsten may be used. The radiopacity agent(s) may be loaded in any amount, including, for example, 5, 10, 20, 25, 32.5, 40, 50, 60, 65, 70, 75, 80, 85, 90, 95 or 100%. When Tungsten is utilized as a radiopacity agent, it may be loaded to a concentration of 1, 2, 3, 4, 5, 6, 7, 8, 9, 10, 11, 12, 13, 14, 15, 16, 17, 18, 19 or 20%. PolyMag® may be utilized as a radiopacity agent, for example at a concentration of 10, 11, 12, 13, 14, 15, 16, 17, 18, 19, 20, 21, 22, 23, 24 or 25%.

As used herein, "X-ray detectable thermoset composite," "X-ray detectable composite," "X-ray detectable thermoset" and "X-ray detectable thermoset formulation," or any similar phrase refers to a thermoset material of any size capable of detection by an X-ray detector.

As used herein, "metal detectable additive" refers to one or more agent capable of detection by a metal detector. Any metal detectable additive may be employed in the present metal detectable material. Suitable metal detectable additives according to the present subject matter include, for example Tungsten and Eriez PolyMag® Additives.

In the case of metal detectable additives, When Tungsten is utilized as a metal additive, it may be loaded to a concentration of 1, 2, 3, 4, 5, 6, 7, 8, 9, 10, 11, 12, 13, 14, 15, 16, 17, 18, 19 or 20%. PolyMag may be utilized as a metal additive, for example at a concentration of 10, 11, 12, 13, 14, 15, 16, 17, 18, 19, 20, 21, 22, 23, 24 or 25%.

As used herein, "metal detectable thermoset composite," "metal detectable composite," "metal detectable thermoset" and/or "metal detectable thermoset formulation," or any similar phrase refers to a thermoset material of any size capable of detection by a metal detector.

As used herein, the term "fragment" refers to a small part of either metal detectable thermoset composite or X-ray detectable thermoset composite that has a length along any axis, edge or cross-section of between from 1 mm to 2 mm, 1 mm to 3.125 mm, 1 mm to 4.5 mm, 1 mm to 5.375 mm, 1 mm to 6.5 mm, 2 mm to 3.125 mm, 2 mm to 4.5 mm, 2 mm to 5.375 mm, 2 mm to 6.5 mm, 3.125 mm to 4.5 mm, 3.125 mm to 5.375 mm, 3.125 mm to 6.5 mm, 4.5 mm to 5.375 mm, 4.5 mm to 6.5 mm. The fragment may have a length along any axis, edge or cross-section at least 1 mm, at least 2 mm, at least 3.125 mm, at least 4.5 mm, at least 5.375 mm, or at least 6.5 mm. The fragment may have a length along any axis, edge or cross-section 1 mm or less, 2 mm or less, 3.125 mm or less, 4.5 mm or less, 5.375 mm or less, 6.5 mm or less. The fragment may have a length along any axis, edge or cross-section of 1 mm, 2 mm, 3.125 mm, 4.5 mm, 5.375 mm or 6.5 mm. The fragment may have broken or otherwise separated off from a larger piece of material such as, for example, a tray for foodstuff formed from an X-ray or metal detectable composite as described herein.

"Reinforcement materials," also known as "reinforcements" refer to any known materials used in molding or extruding compositions to add strength. According to the present subject matter, the reinforcement material can be one or more of glass, glass fibers or fabrics, carbon fibers or fabrics, asbestos fibers or fabrics, various organic fibers or fabrics, such as those made of polypropylene, acrylonitrile/vinyl chloride copolymer, and others known to the art.

Formulations

The X-ray or metal detectable thermoset composite may comprise or consist of one or more polyester or vinyl ester resin; one or more radiopacity agent; and a cross-linking agent. The X-ray or metal detectable thermoset composite may further comprise or consist of one or more of the following additives: a low profile additive, an accelerator, a cure inhibitor, a mineral filler, a rutile titanate, a lubricant, a thickener, a metal additive and a reinforcement material.

The resin may be present in of 15-25%, by weight based on total weight of the composition. The resin may also be present in an amount of 18-22%, by weight based on total weight of the composition.

The one or more radiopacity agent may be present in the composition in an amount of 5 to 75%, by weight based on total weight of the composition. Likewise, the one or more radiopacity agent may be present in the composition in an amount of 10 to 65%, by weight based on total weight of the composition. The one or more radiopacity agent may be present in the composition in an amount of 20 to 50%, by weight based on total weight of the composition. The radiopacity agent may also be present in an amount of 10 to 30%, by weight based on total weight of the composition.

According to the present subject matter the radiopacity agent may be one or more radiopacity agents, including, e.g., barium sulfate, tungsten and/or stainless steel. The radiopacity agent may be a combination of two or more radiopacity agents. For example, a combination of barium sulfate and tungsten may be used. The radiopacity agent may include the same radiopacity agents of different particle sizes. For example, the radiopacity agents may include barium sulfate having particle sizes of both 0.7 µm and 18 µm.

The X-ray detectable thermoset composition may be detected at any size. For example, a detectable fragment may have a length of from 1 mm to 6.5 mm along any edge, cross-section or axis thereof, is detectable by an X-ray detector. A fragment may have a length of from 1 mm to 4.5 mm, 1 mm to 3.125 mm, 2 mm to 6.5 mm, 2 mm to 4.5 mm or 2 mm to 3.125 mm, along any edge, cross-section or axis thereof, is detectable by an X-ray detector.

Methods

Also provided are methods for detecting a fragment of an X-ray detectable thermoset composition for use in preparing a foodstuff or pharmaceutical. The method may comprise or consist of providing a substrate comprising the thermoset composite. The thermoset composite may comprise one or more polyester or vinyl ester resin, one or more radiopacity agents selected from the group consisting of barium sulfate, tungsten and stainless steel, and a cross-linking agent. The thermoset composite may be any composite described herein. The method may further include processing the foodstuff or pharmaceutical on the substrate. The method may also include discarding the substrate. The foodstuff or pharmaceutical may be scanned with an X-ray detector or metal detector, to detect one or more fragments of the thermoset composite in the foodstuff or pharmaceutical. If one or more fragment is detected, the foodstuff or pharmaceutical may be discarded.

The methods may include detecting a fragment of the thermoset composite formulations described herein. The fragment may have a length of from 1 mm to 6.5 mm along any edge, cross-section or axis thereof, is detectable by an X-ray detector. The length may be 1 mm to 4.5, 1 mm to 3.125 mm, 2 mm to 6.5 mm, 2 mm to 4.5 or 2 mm to 3.125 along any edge, cross-section or axis thereof, is detectable by an X-ray detector.

Also provided is the use of a thermoset composite substrate as described herein in the preparation of a foodstuff or pharmaceutical. The use may comprise or consist of: providing a substrate comprising the thermoset composite; processing the foodstuff or pharmaceutical on the substrate, discarding the substrate; scanning the foodstuff or pharmaceutical, with an X-ray detector or metal detector, to detect one or more fragments of the thermoset composite in the foodstuff or pharmaceutical; and optionally, discarding the foodstuff or pharmaceutical if one or more fragment is detected.

By way of example, FIG. 1 illustrates a method according to the present subject matter. According to the method, a foodstuff or pharmaceutical is removed from a substrate formed from the X-ray or metal detectable thermoset composite described herein. The foodstuff or pharmaceutical is then scanned, by either X-ray or metal detector, to fragments within the food or pharmaceutical product. The foodstuff or pharmaceutical then passes by means of a conveyer under an X-ray tube and through an X-ray beam sourced from a high-voltage generator 4. Any fragments leftover from the manufacturing process are detected by a high-performance camera and will result in an X-ray image that may be analyzed by means of a computer. A pusher or the like moves adulterated product into a rejection bin.

Figure 2:
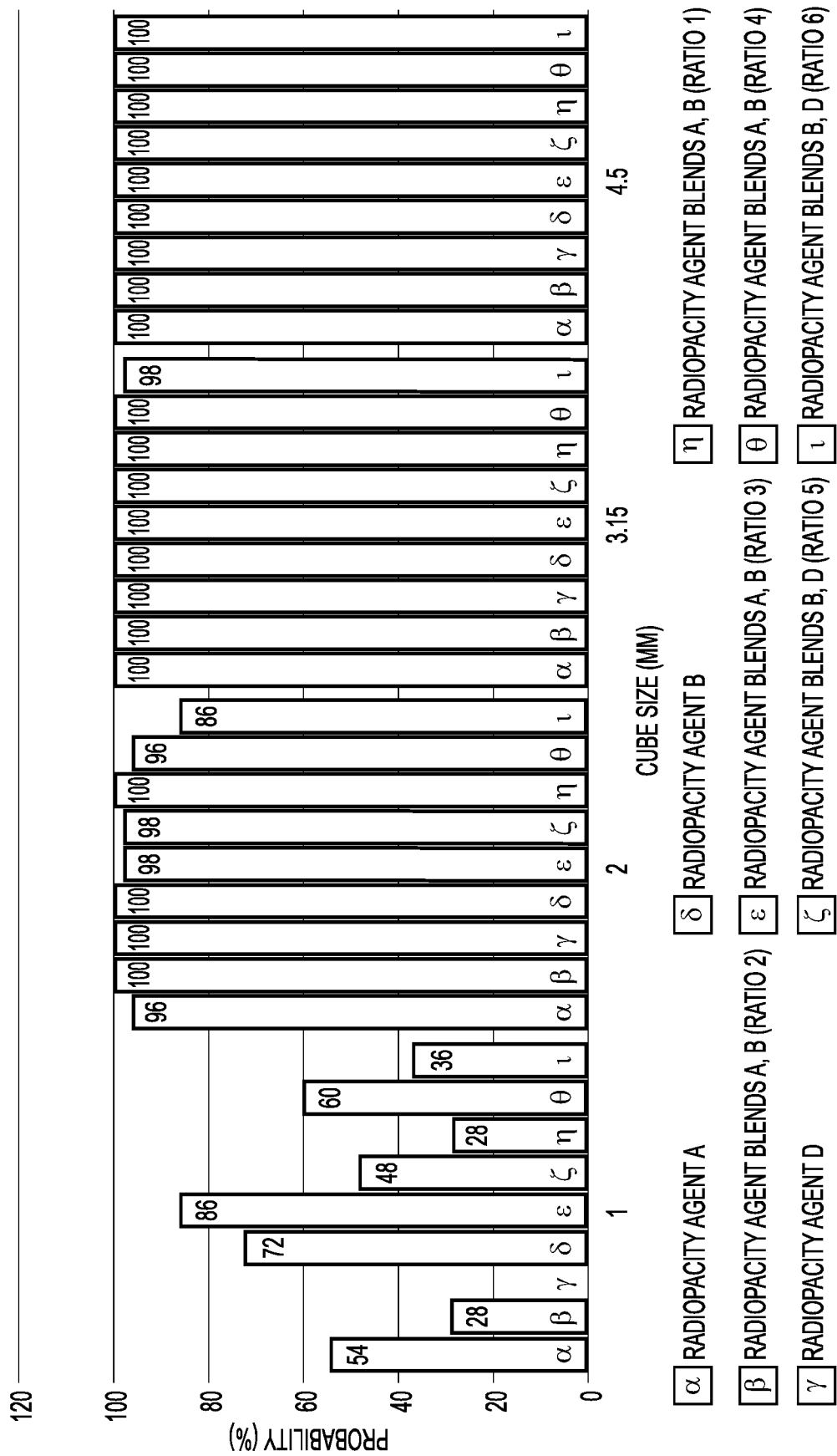
FIG. 2 is a graphic representation of the probability of detecting of varying fragment sizes of different X-ray detectable materials described herein.

FIG. 2 is a graphic representation of the detectability results of the X-ray detectable materials described in Example 1 below. As shown, the thermoset composite formulations described in Tables 2-9 of FIGS. 4-11 are X-ray detectable at varying degrees of probability in fragment sizes of from 1 mm to 4.5 mm.

Any concentration ranges, percentage range, or ratio range recited herein are to be understood to include concentrations, percentages or ratios of any integer within that range and fractions thereof, such as one tenth and one hundredth of an integer, unless otherwise indicated.

Any number range recited herein relating to any physical feature, such as polymer subunits, size, or thickness, are to be understood to include any integer within the recited range, unless otherwise indicated.

Unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained.

Throughout the application, descriptions of the present subject matter may use "comprising" language; however, it will be understood by one of skill in the art, that the subject matter herein can alternatively be described using the language "consisting essentially of" or "consisting of." In addition, to the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

It should also be understood that the terms "a" and "an" as used above and elsewhere herein refer to "one or more" of the enumerated components. It will be clear to one of ordinary skill in the art that the use of the singular includes the plural unless specifically stated otherwise. Therefore, the terms "a," "an" and "at least one" are used interchangeably in this application.

Other terms as used herein are meant to be defined by their well-known meanings in the art.

EXAMPLES

The following examples are illustrative of the present X-ray and/or metal detectable thermoset formulations and are not intended to be limitations thereon.

Example 1

Several X-ray and/or metal detectable thermoset composite formulations were prepared according to the present subject matter. Tests were performed on the composites including X-ray detectability tests, migration tests, and tests providing physical properties of the composites. The thermoset composite formulations are provided in each of tables 1-9 below. Where measured, X-ray detectability is represented as probability of detection at various fragment sizes. Migration testing and physical properties are also provided, when measured. "/" means zero or no test value was obtained.

In order to provide a reference point to compare the X-ray and metal detectable thermoset composites, a comparative thermoset formulation containing no radiopacity agent was prepared. As shown in Table 1 of FIG. 3, the comparative thermoset composite formulation was not detected by an X-ray detector at any fragment size.

Tables 2-9 of FIGS. 4-111 show X-ray detectable thermoset composite formulations prepared according to the present subject matter. In tables 2-8, the thermoset composite formulations include a single radiopacity agent. Table 9 of FIG. 11 includes thermoset composite formulations that have combinations of different radiopacity agents.

Example 2 provides nineteen formulations, eighteen of which are X-ray or metal detectable thermoset composites prepared according to the present subject matter. Formulation 1 of FIG. 12 is a comparative control thermoset composite material, while Formulations 2-19 are non-limiting examples of X-ray and/or metal detectable thermoset composite materials according to the present subject matter. Each of the formulations in examples 1 can be prepared in any manner known in the art. Once prepared, the materials may be molded to form the desirable shape for use.

| Formulation 2: 5% vol | | | | | | | |
|---|---|---|---|---|---|---|---|
| INGREDIENTS | wt. Grams | % BOP | PHR | % BOT | | % BOT wt. grams | % BOP wt. grams |
| | | | | | Batch wt. Grams | | 6150 |
| Q6585 | 60.00 | 19.63 | 60.00 | 16.29 | | 0.00 | 1207.11 |
| Neulon 505 | 20.00 | 6.54 | 20.00 | 5.43 | | 0.00 | 402.37 |
| MR-63004 | 20.00 | 6.54 | 20.00 | 5.43 | | 0.00 | 402.37 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 0.27 | 0.09 | 0.27 | 0.07 | | 0.00 | 5.37 |
| tbpb | 1.33 | 0.44 | 1.33 | 0.36 | | 0.00 | 26.82 |
| Mod E-90655 | 0.25 | 0.08 | 0.25 | 0.07 | | 0.00 | 5.03 |
| omyacarb 5 | 177.40 | 58.03 | 177.40 | 48.18 | | 0.00 | 3569.01 |
| Dupont R-902 Tio2 | 1.25 | 0.41 | 1.25 | 0.34 | | 0.00 | 25.15 |
| coad 20 | 5.00 | 1.64 | 5.00 | 1.36 | | 0.00 | 100.59 |
| Barium Sulfate | 15.50 | 5.07 | 15.50 | 4.21 | | 0.00 | 311.84 |
| am-09059 | 4.69 | 1.53 | 4.69 | 1.27 | | 0.00 | 94.36 |
| | | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| GLASS | | 0.00 | 0.00 | 16.98 | Glass % content | 0.00 | |
| TOTAL | 305.69 | 100.00 | 305.69 | 100.00 | | 0.00 | 6150 |

| Formulation 3: 10% vol | | | | | | | |
|---|---|---|---|---|---|---|---|
| INGREDIENTS | wt. Grams | % BOP | PHR | % BOT | | % BOT wt. grams | % BOP wt. grams |
| | | | | | Batch wt. Grams | | 6150 |
| Q6585 | 60.00 | 19.24 | 60.00 | 15.98 | | 0.00 | 1183.49 |
| Neulon 505 | 20.00 | 6.41 | 20.00 | 5.33 | | 0.00 | 394.50 |
| MR-63004 | 20.00 | 6.41 | 20.00 | 5.33 | | 0.00 | 394.50 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 0.27 | 0.09 | 0.27 | 0.07 | | 0.00 | 5.26 |
| tbpb | 1.33 | 0.43 | 1.33 | 0.36 | | 0.00 | 26.30 |
| Mod E-90655 | 0.25 | 0.08 | 0.25 | 0.07 | | 0.00 | 4.93 |
| omyacarb 5 | 168.00 | 53.88 | 168.00 | 44.73 | | 0.00 | 3313.77 |
| Dupont R-902 Tio2 | 1.25 | 0.40 | 1.25 | 0.33 | | 0.00 | 24.66 |
| coad 20 | 5.00 | 1.60 | 5.00 | 1.33 | | 0.00 | 98.62 |
| am-09059 | 4.69 | 1.50 | 4.69 | 1.25 | | 0.00 | 92.51 |
| Barium Sulfate | 31.00 | 9.94 | 31.00 | 8.25 | | 0.00 | 611.47 |
| | | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| GLASS | | 0.00 | 0.00 | 16.98 | Glass % content | 0.00 | |
| TOTAL | 311.79 | 100.00 | 311.79 | 100.00 | | 0.00 | 6150 |

| Formulation 4: 20% vol | | | | | | | |
|---|---|---|---|---|---|---|---|
| INGREDIENTS | wt. Grams | % BOP | PHR | % BOT | | % BOT wt. grams | % BOP wt. grams |
| | | | | | Batch wt. Grams | | 6150 |
| Q6585 | 60.00 | 18.51 | 60.00 | 15.37 | | 0.00 | 1138.29 |
| Neulon 505 | 20.00 | 6.17 | 20.00 | 5.12 | | 0.00 | 379.43 |
| MR-63004 | 20.00 | 6.17 | 20.00 | 5.12 | | 0.00 | 379.43 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 0.27 | 0.08 | 0.27 | 0.07 | | 0.00 | 5.06 |
| tbpb | 1.33 | 0.41 | 1.33 | 0.34 | | 0.00 | 25.29 |
| Mod E-90655 | 0.25 | 0.08 | 0.25 | 0.06 | | 0.00 | 4.74 |
| omyacarb 5 | 149.38 | 46.08 | 149.38 | 38.26 | | 0.00 | 2833.97 |
| Dupont R-902 Tio2 | 1.25 | 0.39 | 1.25 | 0.32 | | 0.00 | 23.71 |
| coad 20 | 5.00 | 1.54 | 5.00 | 1.28 | | 0.00 | 94.86 |
| am-09059 | 4.69 | 1.45 | 4.69 | 1.20 | | 0.00 | 88.98 |
| Barium Sulfate | 62.00 | 19.13 | 62.00 | 15.88 | | 0.00 | 1176.23 |
| | | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | |
| GLASS | | 0.00 | 0.00 | 16.98 | Glass % content | 0.00 | |
| TOTAL | 324.17 | 100.00 | 324.17 | 100.00 | | 0.00 | 6150 |

| Formulation 5: 25% vol | | | | | | | |
|---|---|---|---|---|---|---|---|
| INGREDIENTS | wt. Grams | % BOP | PHR | % BOT | | % BOT wt. grams | % BOP wt. grams |
| | | | | | Batch wt. Grams | | 6150 |
| Q6585 | 60.00 | 18.17 | 60.00 | 15.08 | | 0.00 | 1117.20 |
| Neulon 505 | 20.00 | 6.06 | 20.00 | 5.03 | | 0.00 | 372.40 |
| MR-63004 | 20.00 | 6.06 | 20.00 | 5.03 | | 0.00 | 372.40 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 0.27 | 0.08 | 0.27 | 0.07 | | 0.00 | 4.97 |
| tbpb | 1.33 | 0.40 | 1.33 | 0.34 | | 0.00 | 24.83 |
| Mod E-90655 | 0.25 | 0.08 | 0.25 | 0.06 | | 0.00 | 4.66 |
| omyacarb 5 | 140.00 | 42.39 | 140.00 | 35.19 | | 0.00 | 2606.80 |
| Dupont R-902 Tio2 | 1.25 | 0.38 | 1.25 | 0.31 | | 0.00 | 23.28 |
| coad 20 | 5.00 | 1.51 | 5.00 | 1.26 | | 0.00 | 93.10 |
| am-09059 | 4.69 | 1.42 | 4.69 | 1.18 | | 0.00 | 87.33 |
| Barium Sulfate | 77.50 | 23.46 | 77.50 | 19.48 | | 0.00 | 1443.05 |
| | | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| GLASS | | 0.00 | 0.00 | 16.98 | Glass % content | 0.00 | |
| TOTAL | 330.29 | 100.00 | 330.29 | 100.00 | | 0.00 | 6150 |

| Formulation 6: 30% vol | | | | | | | |
|---|---|---|---|---|---|---|---|
| INGREDIENTS | wt. Grams | % BOP | PHR | % BOT | | % BOT wt. grams | % BOP wt. grams |
| | | | | | Batch wt. Grams | | 6150 |
| Q6585 | 60.00 | 17.83 | 60.00 | 14.81 | | 0.00 | 1096.84 |
| Neulon 505 | 20.00 | 5.94 | 20.00 | 4.94 | | 0.00 | 365.61 |
| MR-63004 | 20.00 | 5.94 | 20.00 | 4.94 | | 0.00 | 365.61 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 0.27 | 0.08 | 0.27 | 0.07 | | 0.00 | 4.88 |
| tbpb | 1.33 | 0.40 | 1.33 | 0.33 | | 0.00 | 24.37 |
| Mod E-90655 | 0.25 | 0.07 | 0.25 | 0.06 | | 0.00 | 4.57 |
| omyacarb 5 | 130.65 | 38.84 | 130.65 | 32.24 | | 0.00 | 2388.38 |
| Dupont R-902 Tio2 | 1.25 | 0.37 | 1.25 | 0.31 | | 0.00 | 22.85 |
| coad 20 | 5.00 | 1.49 | 5.00 | 1.23 | | 0.00 | 91.40 |
| am-09059 | 4.69 | 1.39 | 4.69 | 1.16 | | 0.00 | 85.74 |
| Barium Sulfate | 92.98 | 27.64 | 92.98 | 22.95 | | 0.00 | 1699.74 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| GLASS | | 0.00 | 0.00 | 16.98 | Glass % content | 0.00 | |
| TOTAL | 336.42 | 100.00 | 336.42 | 100.00 | | 0.00 | 6150 |

| Formulation 7: 32.5% vol | | | | | | | |
|---|---|---|---|---|---|---|---|
| INGREDIENTS | wt. Grams | % BOP | PHR | % BOT | | % BOT wt. grams | % BOP wt. grams |
| | | | | | Batch wt. Grams | | 6150 |
| Q6585 | 60.00 | 17.67 | 60.00 | 14.67 | | 0.00 | 1086.99 |
| Neulon 505 | 20.00 | 5.89 | 20.00 | 4.89 | | 0.00 | 362.33 |
| MR-63004 | 20.00 | 5.89 | 20.00 | 4.89 | | 0.00 | 362.33 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 0.27 | 0.08 | 0.27 | 0.07 | | 0.00 | 4.83 |
| tbpb | 1.33 | 0.39 | 1.33 | 0.33 | | 0.00 | 24.15 |
| Mod E-90655 | 0.25 | 0.07 | 0.25 | 0.06 | | 0.00 | 4.53 |
| omyacarb 5 | 126.00 | 37.12 | 126.00 | 30.81 | | 0.00 | 2282.68 |
| Dupont R-902 Tio2 | 1.25 | 0.37 | 1.25 | 0.31 | | 0.00 | 22.65 |
| coad 20 | 5.00 | 1.47 | 5.00 | 1.22 | | 0.00 | 90.58 |
| am-09059 | 4.69 | 1.38 | 4.69 | 1.15 | | 0.00 | 84.97 |
| Barium Sulfate | 100.68 | 29.66 | 100.68 | 24.62 | | 0.00 | 1823.97 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| GLASS | | 0.00 | 0.00 | 16.98 | Glass % content | 0.00 | |
| TOTAL | 339.47 | 100.00 | 339.47 | 100.00 | | 0.00 | 6150 |

| Formulation 8: 40% vol | | | | | | | |
|---|---|---|---|---|---|---|---|
| INGREDIENTS | wt. Grams | % BOP | PHR | % BOT | | % BOT wt. grams | % BOP wt. grams |
| | | | | | Batch wt. Grams | | 6150 |
| Q6585 | 60.00 | 17.20 | 60.00 | 14.28 | | 0.00 | 1058.06 |
| Neulon 505 | 20.00 | 5.73 | 20.00 | 4.76 | | 0.00 | 352.69 |
| MR-63004 | 20.00 | 5.73 | 20.00 | 4.76 | | 0.00 | 352.69 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 0.27 | 0.08 | 0.27 | 0.06 | | 0.00 | 4.70 |
| tbpb | 1.33 | 0.38 | 1.33 | 0.32 | | 0.00 | 23.51 |
| Mod E-90655 | 0.25 | 0.07 | 0.25 | 0.06 | | 0.00 | 4.41 |
| omyacarb 5 | 112.00 | 32.11 | 112.00 | 26.66 | | 0.00 | 1975.05 |
| Dupont R-902 Tio2 | 1.25 | 0.36 | 1.25 | 0.30 | | 0.00 | 22.04 |
| coad 20 | 5.00 | 1.43 | 5.00 | 1.19 | | 0.00 | 88.17 |
| am-09059 | 4.69 | 1.34 | 4.69 | 1.12 | | 0.00 | 82.71 |
| Barium Sulfate | 123.96 | 35.54 | 123.96 | 29.51 | | 0.00 | 2185.96 |
| | | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| GLASS | | 0.00 | 0.00 | 16.98 | Glass % content | 0.00 | |
| TOTAL | 348.75 | 100.00 | 348.75 | 100.00 | | 0.00 | 6150 |

| Formulation 9: 50% vol | | | | | | | |
|---|---|---|---|---|---|---|---|
| INGREDIENTS | wt. Grams | % BOP | PHR | % BOT | | % BOT wt. grams | % BOP wt. grams |
| | | | | | Batch wt. Grams | | 6150 |
| Q6585 | 60.00 | 16.61 | 60.00 | 13.79 | | 0.00 | 1021.76 |
| Neulon 505 | 20.00 | 5.54 | 20.00 | 4.60 | | 0.00 | 340.59 |
| MR-63004 | 20.00 | 5.54 | 20.00 | 4.60 | | 0.00 | 340.59 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 0.27 | 0.07 | 0.27 | 0.06 | | 0.00 | 4.54 |
| tbpb | 1.33 | 0.37 | 1.33 | 0.31 | | 0.00 | 22.71 |
| Mod E-90655 | 0.25 | 0.07 | 0.25 | 0.06 | | 0.00 | 4.26 |
| omyacarb 5 | 93.35 | 25.85 | 93.35 | 21.46 | | 0.00 | 1589.70 |
| Dupont R-902 Tio2 | 1.25 | 0.35 | 1.25 | 0.29 | | 0.00 | 21.29 |
| coad 20 | 5.00 | 1.38 | 5.00 | 1.15 | | 0.00 | 85.15 |
| am-09059 | 4.69 | 1.30 | 4.69 | 1.08 | | 0.00 | 79.87 |
| Barium Sulfate | 155.00 | 42.92 | 155.00 | 35.63 | | 0.00 | 2639.56 |
| | | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| GLASS | | 0.00 | 0.00 | 16.98 | Glass % content | 0.00 | |
| TOTAL | 361.14 | 100.00 | 361.14 | 100.00 | | 0.00 | 6150 |

| Formulation 10: 75% vol | | | | | | | |
|---|---|---|---|---|---|---|---|
| INGREDIENTS | wt. Grams | % BOP | PHR | % BOT | | % BOT wt. grams | % BOP wt. grams |
| | | | | | Batch wt. Grams | | 6150 |
| Q6585 | 60.00 | 15.31 | 60.00 | 12.71 | | 0.00 | 941.59 |
| Neulon 505 | 20.00 | 5.10 | 20.00 | 4.24 | | 0.00 | 313.86 |
| MR-63004 | 20.00 | 5.10 | 20.00 | 4.24 | | 0.00 | 313.86 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 0.27 | 0.07 | 0.27 | 0.06 | | 0.00 | 4.19 |
| tbpb | 1.33 | 0.34 | 1.33 | 0.28 | | 0.00 | 20.92 |
| Mod E-90655 | 0.25 | 0.06 | 0.25 | 0.05 | | 0.00 | 3.92 |
| omyacarb 5 | 46.80 | 11.94 | 46.80 | 9.91 | | 0.00 | 734.44 |
| Dupont R-902 Tio2 | 1.25 | 0.32 | 1.25 | 0.26 | | 0.00 | 19.62 |
| coad 20 | 5.00 | 1.28 | 5.00 | 1.06 | | 0.00 | 78.47 |
| am-09059 | 4.69 | 1.20 | 4.69 | 0.99 | | 0.00 | 73.60 |
| Barium Sulfate | 232.30 | 59.28 | 232.30 | 49.21 | | 0.00 | 3645.53 |
| | | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| GLASS | | 0.00 | 0.00 | 16.98 | Glass % content | 0.00 | |
| TOTAL | 391.89 | 100.00 | 391.89 | 100.00 | | 0.00 | 6150 |

| Formulation 11: 100% vol | | | | | | | |
|---|---|---|---|---|---|---|---|
| INGREDIENTS | wt. Grams | % BOP | PHR | % BOT | | % BOT wt. grams | % BOP wt. grams |
| | | | | | Batch wt. Grams | | 6150 |
| Q6585 | 60.00 | 14.19 | 60.00 | 11.78 | | 0.00 | 872.77 |
| Neulon 505 | 20.00 | 4.73 | 20.00 | 3.93 | | 0.00 | 290.92 |
| MR-63004 | 20.00 | 4.73 | 20.00 | 3.93 | | 0.00 | 290.92 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 0.27 | 0.06 | 0.27 | 0.05 | | 0.00 | 3.88 |
| tbpb | 1.33 | 0.32 | 1.33 | 0.26 | | 0.00 | 19.39 |
| Mod E-90655 | 0.25 | 0.06 | 0.25 | 0.05 | | 0.00 | 3.64 |
| omyacarb 5 | 0.00 | 0.00 | 0.00 | 0.00 | | 0.00 | 0.00 |
| Dupont R-902 Tio2 | 1.25 | 0.30 | 1.25 | 0.25 | | 0.00 | 18.18 |
| coad 20 | 5.00 | 1.18 | 5.00 | 0.98 | | 0.00 | 72.73 |
| am-09059 | 4.69 | 1.11 | 4.69 | 0.92 | | 0.00 | 68.22 |
| Barium Sulfate | 310.00 | 73.32 | 310.00 | 60.87 | | 0.00 | 4509.33 |
| | | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| GLASS | | 0.00 | 0.00 | 16.98 | Glass % content | 0.00 | |
| TOTAL | 422.79 | 100.00 | 422.79 | 100.00 | | 0.00 | 6150 |

Formulation 12: Tungsten 1%

| INGREDIENTS | wt. Grams | % BOP | PHR | % BOT | | % BOT wt. grams | % BOP wt. grams |
|---|---|---|---|---|---|---|---|
| | | | | | Batch wt. Grams | | 6150 |
| Q6585 | 60.00 | 19.63 | 60.00 | 16.30 | | 0.00 | 1207.50 |
| Neulon 505 | 20.00 | 6.54 | 20.00 | 5.43 | | 0.00 | 402.50 |
| MR-63004 | 20.00 | 6.54 | 20.00 | 5.43 | | 0.00 | 402.50 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 0.27 | 0.09 | 0.27 | 0.07 | | 0.00 | 5.37 |
| tbpb | 1.33 | 0.44 | 1.33 | 0.36 | | 0.00 | 26.83 |
| Mod E-90655 | 0.25 | 0.08 | 0.25 | 0.07 | | 0.00 | 5.03 |
| omyacarb 5 | 184.80 | 60.47 | 184.80 | 50.20 | | 0.00 | 3719.10 |
| Dupont R-902 Tio2 | 1.25 | 0.41 | 1.25 | 0.34 | | 0.00 | 25.16 |
| coad 20 | 5.00 | 1.64 | 5.00 | 1.36 | | 0.00 | 100.63 |
| am-09059 | 4.69 | 1.53 | 4.69 | 1.27 | | 0.00 | 94.39 |
| Tungsten | 8.00 | 2.62 | 8.00 | 2.17 | | 0.00 | 161.00 |
| | | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| GLASS | | 0.00 | 0.00 | 16.98 | Glass % content | 0.00 | |
| TOTAL | 305.59 | 100.00 | 305.59 | 100.00 | | 0.00 | 6150 |

Formulation 13: Tungsten 2%

| INGREDIENTS | wt. Grams | % BOP | PHR | % BOT | | % BOT wt. grams | % BOP wt. grams |
|---|---|---|---|---|---|---|---|
| | | | | | Batch wt. Grams | | 6150 |
| Q6585 | 60.00 | 19.26 | 60.00 | 15.99 | | 0.00 | 1184.63 |
| Neulon 505 | 20.00 | 6.42 | 20.00 | 5.33 | | 0.00 | 394.88 |
| MR-63004 | 20.00 | 6.42 | 20.00 | 5.33 | | 0.00 | 394.88 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 0.27 | 0.09 | 0.27 | 0.07 | | 0.00 | 5.27 |
| tbpb | 1.33 | 0.43 | 1.33 | 0.36 | | 0.00 | 26.32 |
| Mod E-90655 | 0.25 | 0.08 | 0.25 | 0.07 | | 0.00 | 4.94 |
| omyacarb 5 | 183.00 | 58.75 | 183.00 | 48.77 | | 0.00 | 3613.12 |
| Dupont R-902 Tio2 | 1.25 | 0.40 | 1.25 | 0.33 | | 0.00 | 24.68 |
| coad 20 | 5.00 | 1.61 | 5.00 | 1.33 | | 0.00 | 98.72 |
| am-09059 | 4.69 | 1.51 | 4.69 | 1.25 | | 0.00 | 92.60 |
| Tungsten | 15.70 | 5.04 | 15.70 | 4.18 | | 0.00 | 309.98 |
| | | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| GLASS | | 0.00 | 0.00 | 16.98 | Glass % content | 0.00 | |
| TOTAL | 311.49 | 100.00 | 311.49 | 100.00 | | 0.00 | 6150 |

| Formulation 14: Tungsten 3% | | | | | | | |
|---|---|---|---|---|---|---|---|
| INGREDIENTS | wt. Grams | % BOP | PHR | % BOT | | % BOT wt. grams | % BOP wt. grams |
| | | | | | Batch wt. Grams | | 6150 |
| Q6585 | 60.00 | 18.90 | 60.00 | 15.69 | | 0.00 | 1162.61 |
| Neulon 505 | 20.00 | 6.30 | 20.00 | 5.23 | | 0.00 | 387.54 |
| MR-63004 | 20.00 | 6.30 | 20.00 | 5.23 | | 0.00 | 387.54 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 0.27 | 0.08 | 0.27 | 0.07 | | 0.00 | 5.17 |
| tbpb | 1.33 | 0.42 | 1.33 | 0.35 | | 0.00 | 25.84 |
| Mod E-90655 | 0.25 | 0.08 | 0.25 | 0.07 | | 0.00 | 4.84 |
| omyacarb 5 | 181.00 | 57.03 | 181.00 | 47.34 | | 0.00 | 3507.20 |
| Dupont R-902 Tio2 | 1.25 | 0.39 | 1.25 | 0.33 | | 0.00 | 24.22 |
| coad 20 | 5.00 | 1.58 | 5.00 | 1.31 | | 0.00 | 96.88 |
| am-09059 | 4.69 | 1.48 | 4.69 | 1.23 | | 0.00 | 90.88 |
| Tungsten | 23.60 | 7.44 | 23.60 | 6.17 | | 0.00 | 457.29 |
| | | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| GLASS | | 0.00 | 0.00 | 16.98 | Glass % content | 0.00 | |
| TOTAL | 317.39 | 100.00 | 317.39 | 100.00 | | 0.00 | 6150 |

| Formulation 15: Tungsten 5% | | | | | | | |
|---|---|---|---|---|---|---|---|
| INGREDIENTS | wt. Grams | % BOP | PHR | % BOT | | % BOT wt. grams | % BOP wt. grams |
| | | | | | Batch wt. Grams | | 6150 |
| Q6585 | 60.00 | 18.20 | 60.00 | 15.11 | | 0.00 | 1119.57 |
| Neulon 505 | 20.00 | 6.07 | 20.00 | 5.04 | | 0.00 | 373.19 |
| MR-63004 | 20.00 | 6.07 | 20.00 | 5.04 | | 0.00 | 373.19 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 0.27 | 0.08 | 0.27 | 0.07 | | 0.00 | 4.98 |
| tbpb | 1.33 | 0.40 | 1.33 | 0.34 | | 0.00 | 24.88 |
| Mod E-90655 | 0.25 | 0.08 | 0.25 | 0.06 | | 0.00 | 4.66 |
| omyacarb 5 | 177.30 | 53.79 | 177.30 | 44.66 | | 0.00 | 3308.34 |
| Dupont R-902 Tio2 | 1.25 | 0.38 | 1.25 | 0.31 | | 0.00 | 23.32 |
| coad 20 | 5.00 | 1.52 | 5.00 | 1.26 | | 0.00 | 93.30 |
| am-09059 | 4.69 | 1.42 | 4.69 | 1.18 | | 0.00 | 87.51 |
| Tungsten | 39.50 | 11.98 | 39.50 | 9.95 | | 0.00 | 737.05 |
| | | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| GLASS | | 0.00 | 0.00 | 16.98 | Glass % content | 0.00 | |
| TOTAL | 329.59 | 100.00 | 329.59 | 100.00 | | 0.00 | 6150 |

Formulation 16: Tungsten 7%

| INGREDIENTS | wt. Grams | % BOP | PHR | % BOT | | % BOT wt. grams | % BOP wt. grams |
|---|---|---|---|---|---|---|---|
| | | | | | Batch wt. Grams | | 6150 |
| Q6585 | 60.00 | 17.55 | 60.00 | 14.57 | | 0.00 | 1079.29 |
| Neulon 505 | 20.00 | 5.85 | 20.00 | 4.86 | | 0.00 | 359.76 |
| MR-63004 | 20.00 | 5.85 | 20.00 | 4.86 | | 0.00 | 359.76 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 0.27 | 0.08 | 0.27 | 0.06 | | 0.00 | 4.80 |
| tbpb | 1.33 | 0.39 | 1.33 | 0.32 | | 0.00 | 23.98 |
| Mod E-90655 | 0.25 | 0.07 | 0.25 | 0.06 | | 0.00 | 4.50 |
| omyacarb 5 | 173.60 | 50.78 | 173.60 | 42.15 | | 0.00 | 3122.76 |
| Dupont R-902 Tio2 | 1.25 | 0.37 | 1.25 | 0.30 | | 0.00 | 22.49 |
| coad 20 | 5.00 | 1.46 | 5.00 | 1.21 | | 0.00 | 89.94 |
| am-09059 | 4.69 | 1.37 | 4.69 | 1.14 | | 0.00 | 84.36 |
| Tungsten | 55.50 | 16.23 | 55.50 | 13.48 | | 0.00 | 998.35 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| GLASS | | 0.00 | 0.00 | 16.98 | Glass % content | 0.00 | |
| TOTAL | 341.89 | 100.00 | 341.89 | 100.00 | | 0.00 | 6150 |

Formulation 17: Tungsten 10%

| INGREDIENTS | wt. Grams | % BOP | PHR | % BOT | | % BOT wt. grams | % BOP wt. grams |
|---|---|---|---|---|---|---|---|
| | | | | | Batch wt. Grams | | 6150 |
| Q6585 | 60.00 | 16.68 | 60.00 | 13.84 | | 0.00 | 1025.60 |
| Neulon 505 | 20.00 | 5.56 | 20.00 | 4.61 | | 0.00 | 341.87 |
| MR-63004 | 20.00 | 5.56 | 20.00 | 4.61 | | 0.00 | 341.87 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 0.27 | 0.07 | 0.27 | 0.06 | | 0.00 | 4.56 |
| tbpb | 1.33 | 0.37 | 1.33 | 0.31 | | 0.00 | 22.79 |
| Mod E-90655 | 0.25 | 0.07 | 0.25 | 0.06 | | 0.00 | 4.27 |
| omyacarb 5 | 168.00 | 46.69 | 168.00 | 38.77 | | 0.00 | 2871.68 |
| Dupont R-902 Tio2 | 1.25 | 0.35 | 1.25 | 0.29 | | 0.00 | 21.37 |
| coad 20 | 5.00 | 1.39 | 5.00 | 1.15 | | 0.00 | 85.47 |
| am-09059 | 4.69 | 1.30 | 4.69 | 1.08 | | 0.00 | 80.17 |
| Tungsten | 79.00 | 21.96 | 79.00 | 18.23 | | 0.00 | 1350.37 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| | 0.00 | 0.00 | 0.00 | 0.00 | | 0.00 | 0.00 |
| GLASS | | 0.00 | 0.00 | 16.98 | Glass % content | 0.00 | |
| TOTAL | 359.79 | 100.00 | 359.79 | 100.00 | | 0.00 | 6150 |

| Formulation 18: PolyMag 14% ||||||||
|---|---|---|---|---|---|---|---|
| INGREDIENTS | wt. Grams | % BOP | PHR | % BOT | | % BOT wt. grams | % BOP wt. grams |
| Q8585 | 225.00 | 21.21 | 60.00 | 17.61 | Batch wt. Grams | 0.00 | 0.00 |
| Neulon 505 | 75.00 | 7.07 | 20.00 | 5.87 | | 0.00 | 0.00 |
| MR-83004 | 75.00 | 7.07 | 20.00 | 5.87 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 1.00 | 0.09 | 0.27 | 0.08 | | 0.00 | 0.00 |
| tbpb | 5.00 | 0.47 | 1.33 | 0.39 | | 0.00 | 0.00 |
| Mod E-90655 | 1.00 | 0.09 | 0.27 | 0.08 | | 0.00 | 0.00 |
| omyacarb 5 | 585.00 | 55.16 | 156.00 | 45.79 | | 0.00 | 0.00 |
| Dupont R-902 Tio2 | 4.69 | 0.44 | 1.25 | 0.37 | | 0.00 | 0.00 |
| coad 20 | 18.80 | 1.77 | 5.01 | 1.47 | | 0.00 | 0.00 |
| am-09059 | 17.60 | 1.66 | 4.69 | 1.38 | | 0.00 | 0.00 |
| PolyMag | 52.50 | 4.95 | 14.00 | 4.11 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| GLASS | | | 0.00 | 16.98 | Glass % content | 0.00 | |
| TOTAL | 1060.59 | 100.00 | 282.82 | 100.00 | | 0.00 | 0 |

| Formulation 19: PolyMag 21% ||||||||
|---|---|---|---|---|---|---|---|
| INGREDIENTS | wt. Grams | % BOP | PHR | % BOT | | % BOT wt. grams | % BOP wt. grams |
| Q6585 | 225.00 | 21.22 | 60.00 | 17.62 | Batch wt. Grams | 0.00 | 0.00 |
| Neulon 505 | 75.00 | 7.07 | 20.00 | 5.87 | | 0.00 | 0.00 |
| MR-63004 | 75.00 | 7.07 | 20.00 | 5.87 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| cobalt | 1.00 | 0.09 | 0.27 | 0.08 | | 0.00 | 0.00 |
| tbpb | 5.00 | 0.47 | 1.33 | 0.39 | | 0.00 | 0.00 |
| Mod E-90655 | 1.00 | 0.09 | 0.27 | 0.08 | | 0.00 | 0.00 |
| omyacarb 5 | 558.70 | 52.70 | 148.99 | 43.75 | | 0.00 | 0.00 |
| Dupont R-902 Tio2 | 4.69 | 0.44 | 1.25 | 0.37 | | 0.00 | 0.00 |
| coad 20 | 18.80 | 1.77 | 5.01 | 1.47 | | 0.00 | 0.00 |
| am-09059 | 17.60 | 1.66 | 4.69 | 1.38 | | 0.00 | 0.00 |
| PolyMag | 78.40 | 7.39 | 20.91 | 6.14 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| | | 0.00 | 0.00 | 0.00 | | 0.00 | 0.00 |
| GLASS | | | 0.00 | 16.98 | Glass % content | 0.00 | |
| TOTAL | 1060.19 | 100.00 | 282.72 | 100.00 | | 0.00 | 0 |

Example 3

In order to evaluate the probability of detecting a contaminant in a foodstuff using X-ray detection, 12 formulations according to the present subject matter were prepared and formed into cubes having edge lengths of different sizes-1 mm, 2 mm, 3.125 mm, 4.5 mm, 5.375 mm and 6.5 mm. The cubes included Huber Barium Sulfate as a radiopacity agent. The cubes were attached to bags of foodstuff and scanned on a Wipotec GmbH (Kaiserslautern, Germany) Model SC 3000 C X-ray machine at a rate of 25 m/min with a 640 µm resolution camera. The Huber Barium Sulfate was included in a particle size of 1 µm, 7 µm or 10 µm and loaded at 5%, 10% or 20%. The detectability results are illustrated in Table 10 of FIG. 13. As shown in Table 10 of FIG. 13, the barium loaded thermoset composites tested in Example 3 were X-ray detectable in fragment sizes having lengths as small 1 mm. All of the barium loaded thermoset composites tested exhibited 100% probability of detection at a fragment size of at least 5.375 mm. In addition, all of the barium loaded thermoset composites tested exhibited at least a 50% probability of detection at a fragment length size of 3.125 mm. Notably, when loaded to at least 10% with barium of any size, composite fragments of as small as 2 mm were detected with a probability of 20% or greater.

Example 4

TABLE 11

SMC Formulation for metal detectable tray

| INGREDIENTS | Expt-110 |
|---|---|
| PolyMag as Percentage of Resin | 14% |
| Ashland 6585 (d = 1.11) | 225 |
| NeuIon 505 (d = 1) | 75 |
| MR-63004 (0.995) | 75 |
| IN 90387 5% PBQ | 1 |
| Trigonox C | 5 |
| 6% CoNapthanate (1.1) | 1 |
| DuPont TiO2 Ti-Pure ®R-902+ (4.0) | 4.688 |
| Coad 20 (1.04) | 18.8 |
| Omyacarb 5 (2.70) | 585 |
| PolyMag (Calc d = 7.73) | 52.5 |
| AM-09059 (1.52) | 17.6 |
| Total | 1060.588 |

TABLE 12

Test pieces (cured SMC from formulation in Example 11) were submitted to External Vendor A and External Vendor B for metal detection tests.

| Vendor A | Vendor B |
|---|---|
| Five 0.12" × 0.12" × 0.1" | Four 1" × ⅛" |
| Five 0.25" × 0.25" × 0.1" | Four 1" × ¼" |
| Five 0.5" × 0.5" × 0.1" | Four ¼" × ¼" |
| Five 0.12" × 0.5" × 0.1" | Four 1" × 1" |
| One 4" × 4" × 0.1" | One 4" × 4" × 0.1" |

Results and Discussion:

Hard objects greater than 0.275" (7 mm) in length are considered a choking hazard by the FDA and are not permitted in food intended for sale. Hence food manufacturers are interested in installing metal and X-ray detectors to prevent unwanted objects in food.

When stainless steel powder (PolyMag) is added to a thermoset composite tray, tray materials could be detected by metal detector. By increasing the loading of PolyMag, the tray chips of reduced size can be detected by metal detector. For initial evaluation, 7, 14 and 21 weight percentages of stainless steel powder (PolyMag) with respect to resin were added to 5336 white starch tray formulation.

Metal detection tests on conductive commercial tray and cured paste (without glass) containing 7, 14 and 21 weight % PolyMag were conducted. Highest conductive commercial tray material from MFG-Linesville is not detectable by metal detector. When stainless steel powder was added, tray materials could be detected by metal detector. By increasing the loading of PolyMag, the tray chips of reduced size can be detected by metal detector.

Table 4 shows SMC formulation containing 14% PolyMag with respect to resin. Here the loading of Omyacarb was reduced so that the overall density is equivalent to the 5336 white starch tray formulation. The scaled-up formulation containing PolyMag matured and cured like 5336 tray material, while acquiring a gray color from stainless steel powder.

All publications cited in the specification are indicative of the level of skill of those skilled in the art to which the presently described subject matter pertains. All of these publications are hereby incorporated by reference herein to the same extent as if each individual publication were specifically and individually indicated as being incorporated by reference.

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

We claim:

1. An X-ray detectable thermoset composition, comprising:
   one or more polyester or vinyl ester resin;
   one or more radiopacity agent selected from the group consisting of barium sulfate, tungsten and stainless steel, the radiopacity agent being present in an amount by weight of from 5% to 25% based on total weight of the composition;
   a cross-linking agent; and
   optionally one or more additives selected from the group consisting of a low profile additive, an accelerator, a cure inhibitor, a mineral filler, a rutile titanate, a lubricant, a thickener, a metal additive and a reinforcement material,
   wherein any fragment of the composition having a length of 6.5 mm or less but at least 1 mm, measuring along any edge, cross-section or axis thereof, is detectable by an X-ray detector and metal detector; and wherein the composition is molded.

2. The X-ray detectable thermoset composition of claim 1, wherein the resin is present in an amount of 15-25%, by weight based on total weight of the composition.

3. The X-ray detectable thermoset composition of claim 2, wherein the one or more resin is present in an amount of 18-22%, by weight based on total weight of the composition.

4. The X-ray detectable thermoset composition of claim 1, wherein the one or more resin is a polyester resin.

5. The X-ray detectable thermoset composition of claim 1, wherein the one or more resin is a vinyl resin.

6. The X-ray detectable thermoset composition of claim 1, wherein the one or more radiopacity agent is barium sulfate.

7. The X-ray detectable thermoset composition of claim 1, wherein the one or more radiopacity agent is tungsten.

8. The X-ray detectable thermoset composition of claim 1, wherein the one or more radiopacity agent comprises stainless steel.

9. The X-ray detectable thermoset composition of claim 1, wherein the one more radiopacity agents are barium sulfate and tungsten.

10. The X-ray detectable thermoset composition of claim 1, wherein the one or more radiopacity agents have different particle sizes.

11. The X-ray detectable thermoset composition of claim 1, wherein the one or more radiopacity agents are barium sulfate in at least two particle sizes.

12. The X-ray detectable thermoset composition of claim 11, wherein the at least two particle sizes are 0.7 μm and 18 μm.

13. The X-ray detectable thermoset composition of claim 1, wherein the fragment has a length of from 1 mm to 4.5 mm along any edge, cross-section or axis thereof.

14. The X-ray detectable thermoset composition of claim 1, wherein the fragment has a length of from 1 mm to 3.125 mm along any edge, cross-section or axis thereof.

15. The X-ray detectable thermoset composition of claim 1, wherein the fragment has a length of from 2 mm to 6.5 mm along any edge, cross-section or axis thereof.

16. The X-ray detectable thermoset composition of claim 1, wherein the fragment has a length of from 2 mm to 4.5 mm along any edge, cross-section or axis thereof.

17. The X-ray detectable thermoset composition of claim 1, wherein the fragment has a length of from 2 mm to 3.125 mm along any edge, cross-section or axis thereof.

18. A method for detecting a fragment of an X-ray detectable thermoset composition for use in preparing a foodstuff or pharmaceutical, comprising:
   providing a substrate comprising the thermoset composite, the thermoset composite comprising:
      one or more polyester or vinyl ester resin,
      one or more radiopacity agents selected from the group consisting of barium sulfate, tungsten and stainless steel, and
      a cross-linking agent;
   processing the foodstuff or pharmaceutical on the substrate,
   discarding the substrate;
   scanning the foodstuff or pharmaceutical, with an X-ray detector or metal detector, to detect one or more fragments of the thermoset composite in the foodstuff or pharmaceutical having a length of 6.5 mm or less but at least 1 mm, measuring along any edge, cross-section, or axis thereof; and
   optionally, discarding the foodstuff or pharmaceutical if one or more fragment is detected.

19. Use of a thermoset composite substrate in the preparation of a foodstuff or pharmaceutical, comprising
   providing a substrate comprising the thermoset composite, the thermoset composite comprising
      one or more polyester or vinyl ester resin,
      one or more radiopacity agents selected from the group consisting of barium sulfate, tungsten and stainless steel, and
      a cross-linking agent;
   processing the foodstuff or pharmaceutical on the substrate,
   discarding the substrate;
   scanning the foodstuff or pharmaceutical, with an X-ray detector or metal detector, to detect one or more fragments of the thermoset composite in the foodstuff or pharmaceutical having a length of 6.5 mm or less but at least 1 mm, measuring along any edge, cross-section, or axis thereof; and
   optionally, discarding the foodstuff or pharmaceutical if one or more fragment is detected.

\* \* \* \* \*